US012742866B2

(12) United States Patent
Soman et al.

(10) Patent No.: US 12,742,866 B2
(45) Date of Patent: Sep. 22, 2026

(54) LOW POWER PRESENCE DETECTION IN COLLABORATIVE ENVIRONMENT

(71) Applicant: QUALCOMM Incorporated, San Diego, CA (US)

(72) Inventors: Mehul Soman, San Jose, CA (US); Diyan Teng, Sunnyvale, CA (US); Nisarg Keyurbhai Trivedi, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 18/883,135

(22) Filed: Sep. 12, 2024

(65) Prior Publication Data

US 2026/0072148 A1 Mar. 12, 2026

(51) Int. Cl.
*G01S 7/52* (2006.01)
*G01S 15/04* (2006.01)
*H04L 67/12* (2022.01)

(52) U.S. Cl.
CPC .......... *G01S 7/52004* (2013.01); *G01S 15/04* (2013.01); *H04L 67/12* (2013.01)

(58) Field of Classification Search
CPC ....... G01S 7/52004; G01S 15/04; H04L 67/12
USPC ............................................................ 367/93
See application file for complete search history.

(56) References Cited

U.S. PATENT DOCUMENTS 12,044,790 B2 * 7/2024 Regani .................... G01S 13/56
12,391,255 B2 * 8/2025 Shuman ................. G06V 20/64
12,414,000 B2 * 9/2025 Au .......................... G01S 13/56
2016/0154089 A1 * 6/2016 Altman .................. G08B 29/26 367/124
2023/0331235 A1 10/2023 Shuman et al.
2023/0417861 A1 12/2023 Edge et al.

FOREIGN PATENT DOCUMENTS

EP 4102247 A1 12/2022

OTHER PUBLICATIONS

International Search Report and Written Opinion—PCT/US2025/042112—ISA/EPO—Nov. 10, 2025.

* cited by examiner

*Primary Examiner* — Eric Blount
(74) *Attorney, Agent, or Firm* — QUALCOMM Incorporated

(57) ABSTRACT

In some implementations, a coordinating device may perform presence detection based on collaborative ultrasound sensing by identifying a plurality of sensing devices within a predetermined area and obtaining ultrasound sensing capability reports from the plurality of sensing devices. The coordinating device may also determine a collaborative ultrasound sensing configuration for the plurality of sensing devices based on the ultrasound sensing capability reports for increasing a collective sensing field of view (FOV) formed by individual FOVs of the plurality of sensing devices, under constraints of a device resource for the plurality of sensing devices. The coordinating device may also transmit, to at least one sensing device of the plurality of sensing devices, the collaborative ultrasound sensing configuration for performing the collaborative ultrasound sensing.

18 Claims, 13 Drawing Sheets

LOW POWER PRESENCE DETECTION IN COLLABORATIVE ENVIRONMENT

TECHNICAL FIELD

The present disclosure relates generally to the field of presence detection by an electronic device in a collaborative sensing environment.

BACKGROUND

There is a need for reliable and efficient methods for continuous monitoring of human presence detection near user devices. Presence detection involves tracking a target when the target is detected within a predetermined field of view (FOV) of the device. Traditional presence detection systems typically rely on time-of-flight sensors and camera-based technologies, which have significant limitations and drawbacks, such as high-power consumption, limited FOVs, and privacy concerns. Existing presence detection systems using ultrasound offer an alternative, but they still suffer from issues like narrow-band interference in the same signal band and high-power consumption.

BRIEF SUMMARY

An example method for presence detection, according to this description, may include performing a non-ultrasound sensing of a target using one or more non-ultrasound sensors of the sensing device. The method may also include determining whether the target is within a first field of view (FOV) of one or more ultrasound sensors of the sensing device based on a result of the non-ultrasound sensing, according to a predetermined criterion. The method may also comprise performing an ultrasound sensing for the target using the one or more ultrasound sensors based on the determination of whether the target is within the first FOV.

An example sensing device, according to this description, may include one or more non-ultrasound sensors, one or more memories; and one or more processors communicatively coupled with the one or more non-ultrasound sensors and the one or more memories. The one or more processors may be configured to perform a non-ultrasound sensing of a target using the one or more non-ultrasound sensors, and determine whether the target is within a first field of view (FOV) of one or more ultrasound sensors of the sensing device based on a result of the non-ultrasound sensing, according to a predetermined criterion. The one or more processors also may be configured to perform an ultrasound sensing for the target using the one or more ultrasound sensors based on the determination of whether the target is within the first FOV.

Another example sensing device, according to this description, may include means for performing a non-ultrasound sensing of a target using one or more non-ultrasound sensors of the sensing device. The sensing device may also include means for determining whether the target is within a first field of view (FOV) of one or more ultrasound sensors of the sensing device based on a result of the non-ultrasound sensing, according to a predetermined criterion. The sensing device may also include means for performing an ultrasound sensing for the target using the one or more ultrasound sensors based on the determination of whether the target is within the first FOV.

An example method for presence detection based on collaborative ultrasound sensing, according to this description, the method may include identifying a plurality of sensing devices within a predetermined area. The method may also include obtaining ultrasound sensing capability reports from the plurality of sensing devices. The method may furthermore include determining a collaborative ultrasound sensing configuration for the plurality of sensing devices based on the ultrasound sensing capability reports for increasing a collective sensing field of view (FOV) formed by individual FOVs of the plurality of sensing devices, under constraints of a device resource for the plurality of sensing devices. The method may in addition include transmitting, to at least one sensing device of the plurality of sensing devices, the collaborative ultrasound sensing configuration for performing the collaborative ultrasound sensing.

An example device, according to this description, the may include one or more transceivers, one or more memories, and one or more processors communicatively coupled with the one or more transceivers and the one or more memories. The one or more processors may be configured to identify a plurality of sensing devices within a predetermined area, and obtain ultrasound sensing capability reports from the plurality of sensing devices. The one or more processors also may be configured to determine a collaborative ultrasound sensing configuration for the plurality of sensing devices based on the ultrasound sensing capability reports for increasing a collective sensing field of view (FOV) formed by individual FOVs of the plurality of sensing devices, under constraints of a device resource for the plurality of sensing devices. The one or more processors may be configured to transmit, via the one or more transceivers to at least one sensing device of the plurality of sensing devices, the collaborative ultrasound sensing configuration for performing the collaborative ultrasound sensing.

Another example device, according to this description, may include means for identifying a plurality of sensing devices within a predetermined area. The device may also include means for obtaining ultrasound sensing capability reports from the plurality of sensing devices. The device may furthermore include means for determining a collaborative ultrasound sensing configuration for the plurality of sensing devices based on the ultrasound sensing capability reports for increasing a collective sensing field of view (FOV) formed by individual FOVs of the plurality of sensing devices, under constraints of a device resource for the plurality of sensing devices. The device may also include means for transmitting, to at least one sensing device of the plurality of sensing devices, the collaborative ultrasound sensing configuration for performing the collaborative ultrasound sensing.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
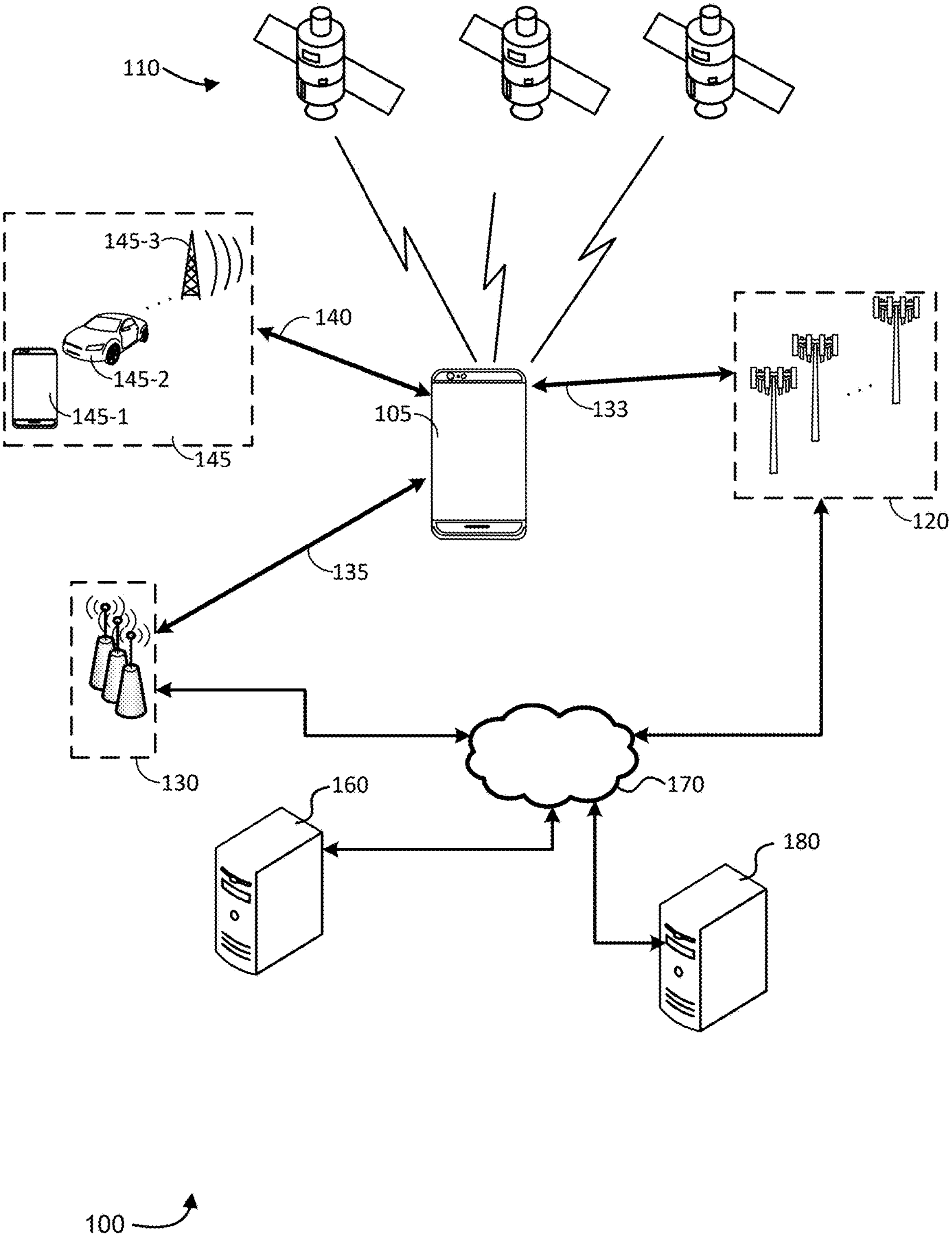
FIG. 1 is a simplified illustration of a wireless system capable of communication and positioning.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Several illustrative examples concerning the accompanying drawings will now be described, which form a part hereof. While particular examples in which one or more aspects of the disclosure may be implemented are described below, other examples may be used, and various modifications may be made without departing from the scope of the disclosure.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification do not necessarily refer to the same example. Furthermore, the particular features, structures, or characteristics may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the terms "user device," "mobile device," and "User Equipment" (UE) may be used interchangeably and are not intended to be specific or otherwise limited to any particular Radio Access Technology (RAT) unless otherwise noted. In general, a user device, a mobile device, and/or UE may be any wireless communication device (e.g., a mobile phone, router, tablet computer, laptop computer, tracking device, wearable (e.g., smartwatch, glasses, Augmented Reality (AR)/Virtual Reality (VR) headset, etc.), vehicle (e.g., automobile, vessel, aircraft motorcycle, bicycle, etc.), Internet of Things (IoT) device, etc.), or another electronic device that may be used for Global Navigation Satellite Systems (GNSS) positioning as described herein. According to some embodiments, a user device, a mobile device, and/or UE may be used to communicate over a wireless communications network. A UE may be mobile or may (e.g., at certain times) be stationary and may communicate with a Radio Access Network (RAN). As used herein, the term UE may be referred to interchangeably as an Access Terminal (AT), a client device, a wireless device, a subscriber device, a subscriber terminal, a subscriber station, a user terminal (UT), a mobile device, a mobile terminal, a mobile station, or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 standard, etc.), and so on.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

As used herein, passive sensing of a target using one or more passive sensors refers to performing the sensing function without emitting energy. Active sensing of a target using one or more active sensors refers to performing the sensing function by actively emitting RF signals and performing the sensing based on processing reflections of the emitted RF signals.

As used herein, the target for presence detection may refer to one or more people (e.g., human users), one or more pets, or any object off which ultrasound signals can reflect. When detecting the presence of the target, the presence detection/sensing function may include detecting the target's approach, departure, and/or interaction with the sensing device, as well as sensing the target itself.

As used herein, "ultrasound signals" are a type of RF signal, specifically sound waves with frequencies starting around approximately 20 kHz and, as an example, up to 600 kHz, which are typically outside the human auditory range, or at least the most sensitive part of the human auditory range. These frequency ranges are offered according to the capabilities of speakers and microphones on the sensing device and may be adjusted as necessary.

Field of View (FOV), which refers to the range over which a sensing device can effectively detect and monitor presence or movement. This includes a flexible range of parameters such as azimuth (horizontal angle), elevation (vertical angle), distance (range of detection), velocity (including Doppler effects for speed detection), and signal-to-noise ratio (SNR), which impacts the clarity and reliability of the detection.

As noted above, there is a need for reliable and efficient methods for continuous monitoring of human presence detection near user devices. Presence detection involves tracking a target when the target is detected within a predetermined FOV of the device. Traditional presence detection systems typically rely on time-of-flight sensors and camera-based technologies, which have significant limitations and drawbacks, such as high-power consumption and privacy concerns. Existing presence detection systems using ultrasound offer an alternative, but they still suffer from issues like interference with communication signals and high-power consumption.

Various aspects relate generally to the field of RF-type sensing and more specifically to presence detection in a collaborative sensing environment. The technical solutions disclosed herein using a sensor fusion method reduce power consumption of the sensing system while maintaining detection accuracy. In some embodiments, a sensing device (e.g., a mobile device, a UE) may include different sets of sensors: low-power sensors (e.g., non-ultrasound sensors such as accelerometers, audio sensors, ambient light sensors, and/or other suitable passive sensors) and high-power sensors (e.g., ultrasound sensors including speakers and microphones and/or other suitable active sensors). The high-power sensors may consume more electrical power than the low-power sensors when performing a sensing function but may provide higher sensing accuracy. According to the technical solutions disclosed herein, a low-power sensing function may first be performed using one or more low-power sensors of the sensing device to determine whether the target is within a first FOV of the high-power sensors (e.g., approaching or leaving a FOV of about three feet from the sensing device). Responsive to the target being within the first FOV, high-power sensing may be performed using one or more high-power sensors of the sensing device. This approach reduces power consumption while maintaining detection accuracy.

Additionally or alternatively, when performing high-power sensing, if the approximate relative location of the target with respect to the sensing device is shorter than a predetermined range and/or the target is within a second FOV (e.g., within about 1.5 feet of the sensing device), sensing signals with different configurations (e.g., bandwidth, duration, power, etc.) may be used to further reduce power consumption while maintaining sensing accuracy.

In some embodiments, to further improve sensing performance, multiple nearby sensing devices can collaborate or be coordinated to increase a collective FOV formed by the individual FOVs of the multiple nearby sensing devices. The collective FOV may be shared among the multiple sensing devices to enhance each device's sensing performance. For example, the multiple sensing devices may transmit capability reports to a coordinating device (e.g., one of the multiple sensing devices or a separate server), indicating one or more device resources (e.g., processing availability, computing power, electrical power, etc.) of the corresponding sensing device, to determine a collaborative ultrasound sensing configuration. The collaborative ultrasound sensing configuration may include parameters such as sensing signal pattern, transmission power, frequency bandwidth allocation, or any combination thereof, to optimize the collective FOV under the constraints of the device resources of each of the multiple sensing devices.

By implementing the technical solutions disclosed herein, power consumption for presence detection will be reduced while maintaining sensing accuracy. Additionally, privacy concerns associated with existing time-of-flight sensors and camera-based technologies will be alleviated. Moreover, by coordinating nearby sensing devices to form a collective FOV shared by the sensing devices, presence detection performance can be further enhanced.

Although embodiments described herein are presented in the context of presence detection applications, the embodiments are not so limited. They may also be used for other object-sensing applications, such as sensing the location, distance, velocity, and other characteristics of objects. Furthermore, the types of sensors specifically mentioned herein are provided as examples and are not intended to be limiting. Embodiments may involve using other suitable sensors without deviating from the spirit of the description. A person of ordinary skill in the art will appreciate other such applications.

FIG. 1 is a simplified illustration of a wireless system capable of communication and positioning, referred to herein as a "communication/positioning system" 100 in which a mobile device 105, network function server 160, and/or other components of the communication/positioning/sensing 100 can use the techniques provided herein for GNSS-based positioning with improved TTFF disclosed herein, according to an embodiment. (That said, embodiments are not necessarily limited to such a system.) The techniques described herein may be implemented by one or more components of the communication/positioning/sensing 100. The communication/positioning/sensing 100 can include: a mobile device 105; one or more satellites 110

(also referred to as space vehicles (SVs)), which may include Global Navigation Satellite System (GNSS) satellites (e.g., satellites of the Global Positioning System (GPS), GLONASS, Galileo, Beidou, etc.) and or Non-Terrestrial Network (NTN) satellites; base stations 120; access points (APs) 130; network function server 160; network 170; and external client 180. Generally put, the communication/positioning/sensing 100 may be capable of enabling communication between the mobile device 105 and other devices, positioning of the mobile device 105 and/or other devices, performing RF sensing by the mobile device 105 and/or other devices, or a combination thereof. For example, the communication/positioning/sensing 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additionally or alternatively, wireless devices such as the mobile device 105, base stations 120, and satellites 110 (and/or other NTN platforms, which may be implemented on airplanes, drones, balloons, etc.) can be utilized to perform positioning (e.g., of one or more wireless devices) and/or perform RF sensing (e.g., of one or more objects by using RF signals transmitted by one or more wireless devices).

It should be noted that FIG. 1 provides only a generalized illustration of various components, any or all of which may be utilized as appropriate, and each of which may be duplicated as necessary. Specifically, although only one mobile device 105 is illustrated, it will be understood that many UEs (e.g., hundreds, thousands, millions, etc.) may utilize the communication/positioning/sensing 100. Similarly, the communication/positioning/sensing 100 may include a larger or smaller number of base stations 120 and/or APs 130 than illustrated in FIG. 1. The illustrated connections that connect the various components in the communication/positioning/sensing 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to network function server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). In and LTE, 5G, or other cellular network, mobile device 105 may be referred to as a user equipment (UE). Network 170 may also include more than one network and/or more than one type of network.

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as network function server 160, by accessing the network 170 via a base station 120 using a first communication link 133. Additionally or alternatively, because APs 130 also may be communicatively coupled with the network 170, mobile device 105 may communicate with network-connected and Internet-connected devices, including network function server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). According to aspects of applicable 5G cellular standards, a base station 120 (e.g., gNB) may be capable of transmitting different "beams" in different directions and performing "beam sweeping" in which a signal is transmitted in different beams, along different directions (e.g., one after the other). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

Satellites 110 may be utilized for positioning in communication in one or more way. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120 and may be coordinated by a network function server 160, which may operate as a location server. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites. NTN satellites 110 and/or other NTN platforms may be further leveraged to perform RF sensing. As described in more detail hereafter, satellites may use a JCS symbol in an Orthogonal Frequency-Division Multiplexing (OFDM) waveform to allow both RF sensing and/or positioning, and communication.

The network function server 160 may comprise one or more servers and/or other computing devices configured to provide a network-managed and/or network-assisted function, such as operating as a location server and/or sensing server. A location server, for example, may determine an estimated location of mobile device 105 and/or provide data (e.g., "assistance data") to mobile device 105 to facilitate location measurement and/or location determination by mobile device 105. According to some embodiments, a location server may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in the location server. In some embodiments, the location server may comprise, a Discovered SLP (D-SLP) or an Emergency SLP (E-SLP). The location server may also comprise an Enhanced Serving Mobile Location Center (E-SMLC) that supports location of mobile device 105 using a control plane (CP) location solution for LTE radio access by mobile device 105. The location server may further comprise a Location Management Function (LMF) that supports location of mobile device 105 using a control plane (CP) location solution for NR or LTE radio access by mobile device 105.

Similarly, the network function server 160, may function as a sensing server. A sensing server can be used to coordinate and/or assist in the coordination of sensing of one or more objects (also referred to herein as "targets") by one or more wireless devices in the communication/positioning/sensing 100. This can include the mobile device 105, base stations 120, APs 130, other mobile devices 145, satellites 110, or any combination thereof. Wireless devices capable of performing RF sensing may be referred to herein as "sensing nodes." To perform RF sensing, a sensing server may coordinate sensing sessions in which one or more RF sensing nodes may perform RF sensing by transmitting RF signals (e.g., reference signals (RSs)), and measuring reflected signals, or "echoes," comprising reflections of the transmitted RF signals off of one or more objects/targets. Reflected signals and object/target detection may be determined, for example, from channel state information (CSI) received at a receiving device. Sensing may comprise (i) monostatic sensing using a single device as a transmitter (of RF signals) and receiver (of reflected signals); (ii) bistatic sensing using a first device as a transmitter and a second device as a receiver; or (iii) multi-static sensing using a plurality of transmitters and/or a plurality of receivers. To facilitate sensing (e.g., in a sensing session among one or more sensing nodes), a sensing server may provide data (e.g., "assistance data") to the sensing nodes to facilitate RS transmission and/or measurement, object/target detection, or any combination thereof. Such data may include an RS configuration indicating which resources (e.g., time and/or frequency resources) may be used (e.g., in a sensing session) to transmit RS for RF sensing. According to some embodiments, a sensing server may comprise a Sensing Management Function (SMF).

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

An estimated location of mobile device 105 can be used in a variety of applications—e.g., to assist direction finding or navigation for a user of mobile device 105 or to assist another user (e.g., associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another UE) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g., including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which mobile device 105 is expected to be located with some level of confidence (e.g., 95% confidence).

The external client 180 may be a web server or remote application that may have some association with mobile device 105 (e.g., may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2:
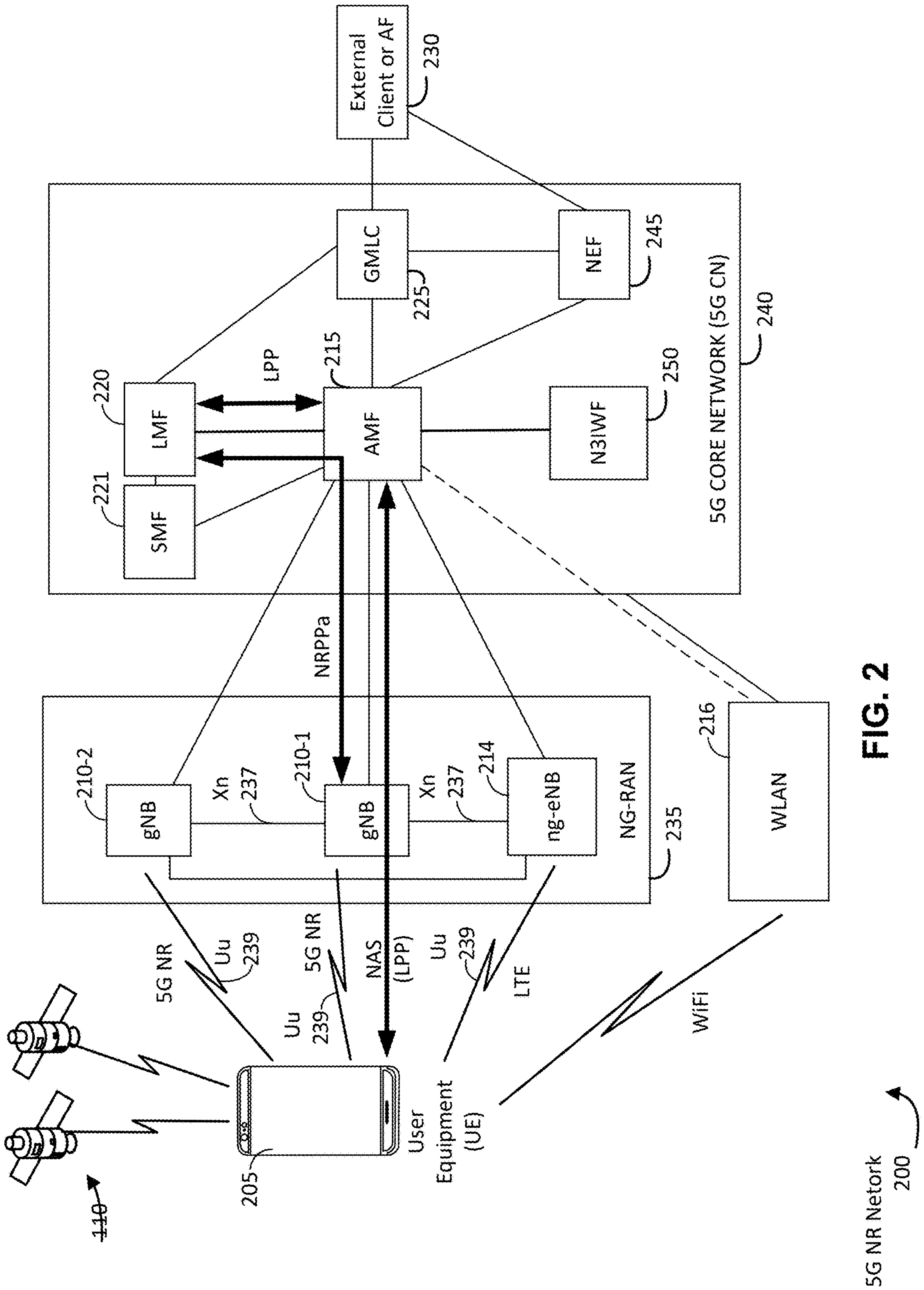
FIG. 2 shows a diagram of a 5G NR network, illustrating an embodiment of a wireless system implemented in 5G NR.

As previously noted, the example communication/positioning/sensing 100 can be implemented using a wireless communication network, such as an LTE-based or 5G NR-based network, or a future 6G network. FIG. 2 shows a diagram of a 5G NR network 200, illustrating an embodiment of a wireless system (e.g., communication/positioning/sensing 100) implemented in 5G NR. The 5G NR network 200 may be configured to enable wireless communication, determine the location of a UE 205 (which may correspond to the mobile device 105 of FIG. 1), facilitate GNSS-based positioning with improved TTFF disclosed herein, or a combination thereof, by using access nodes, which may include NR NodeB (gNB) 210-1 and 210-2 (collectively and generically referred to herein as gNBs 210), ng-eNB 214, and/or WLAN 216. These access nodes can use RF signaling to enable the communication, implement one or more positioning methods, and/or implement RF sensing. The gNBs 210 and/or the ng-eNB 214 may correspond with base stations 120 of FIG. 1, and the WLAN 216 may correspond with one or more access points 130 of FIG. 1. Optionally, the 5G NR network 200 additionally may be configured to determine the location of a UE 205 by using an LMF 220 (which may correspond with location server 160) to implement the one or more positioning methods. The SMF 221 may coordinate RF sensing by the 5G NR network 200. Here, the 5G NR network 200 comprises a UE 205, and components of a 5G NR network comprising a Next Generation (NG) Radio Access Network (RAN) (NG-RAN) 235 and a 5G Core Network (5G CN) 240. A 5G NR network 200 may also be called a 5G network and/or an NR network; NG-RAN 235 may be referred to as a 5G RAN or as an NR RAN; and 5G CN 240 may be referred to as an NG Core network. Additional components of the 5G NR network 200 are described below. The 5G NR network 200 may include additional or alternative components.

The 5G NR network 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR network 200. Similarly, the 5G NR network 200 may include a larger (or smaller) number of satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR network 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), navigation device, Internet of Things (IoT) device, or some other portable or moveable device. Typically, though not necessarily, the UE 205 may support wireless communication using one or more Radio Access Technologies (RATs) such as using GSM, CDMA, W-CDMA, LTE, High-Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support wireless communication using a WLAN 216 which (like the one or more RATs, and as previously noted with respect to FIG. 1) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225). The external client 230 of FIG. 2 may correspond to external client 180 of FIG. 1, as implemented in or communicatively coupled with a 5G NR network.

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 205 via wireless communication between the UE 205 and one or more of the gNBs 210, which may provide wireless communications access to the 5G CN 240 on behalf of the UE 205 using 5G NR. The wireless interface between base stations (gNBs 210 and/or ng-eNB 214) and the UE 205 may be referred to as a Uu interface 239. 5G NR radio access may also be referred to as NR radio access or as 5G radio access. In FIG. 2, the serving gNB for UE 205 is assumed to be gNB 210-1, although other gNBs (e.g. gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 205. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 205. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR network 200, such as the LMF 220 and AMF 215.

5G NR network 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink (UL) and downlink (DL) control plane Non-Access Stratum (NAS) signaling between UE 205 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 205 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term “access node,” as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR network 200), may be configured to, in response to receiving a request for location information from the LMF 220, obtain location measurements of uplink (UL) signals received from the UE 205) and/or obtain downlink (DL) location measurements from the UE 205 that were obtained by UE 205 for DL signals received by UE 205 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 205 may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node (e.g., gNB 210, ng-eNB 214, or WLAN 216) of a first RAT to an access node of a second RAT. The AMF 215 may also participate in supporting a signaling connection to the UE 205 and possibly data and voice bearers for the UE 205. The LMF 220 may support positioning of the UE 205 using a CP location solution when UE 205 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhanced Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 205, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 205's location) may be performed at the UE 205 (e.g., by measuring downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 205 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 205 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 205 may communicate using an LTE Positioning Protocol (LPP) as defined in 3GPP TS 37.355. Here, LPP messages may be transferred between the UE 205 and the LMF 220 via the AMF 215 and a serving gNB 210-1 or serving ng-eNB 214 for UE 205. For example, LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP protocol may be used to support positioning of UE 205 using UE assisted and/or UE based position methods such as A-GNSS, RTK, TDOA, multi-cell RTT, AoD, and/or ECID. The NRPPa protocol may be used to support positioning of UE 205 using network-based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 205 access to WLAN 216, LMF 220 may use NRPPa and/or LPP to obtain a location of UE 205 in a similar manner to that just described for UE 205 access to a gNB 210 or ng-eNB 214. Thus, NRPPa messages may be transferred between a WLAN 216 and the LMF 220, via the AMF 215 and N3IWF 250 to support network-based positioning of UE 205 and/or transfer of other location information from WLAN 216 to LMF 220. Alternatively, NRPPa messages may be transferred between N3IWF 250 and the LMF 220, via the AMF 215, to support network-based positioning of UE 205 based on location related information and/or location measurements known to or accessible to N3IWF 250 and transferred from N3IWF 250 to LMF 220 using NRPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220.

Figure 3:
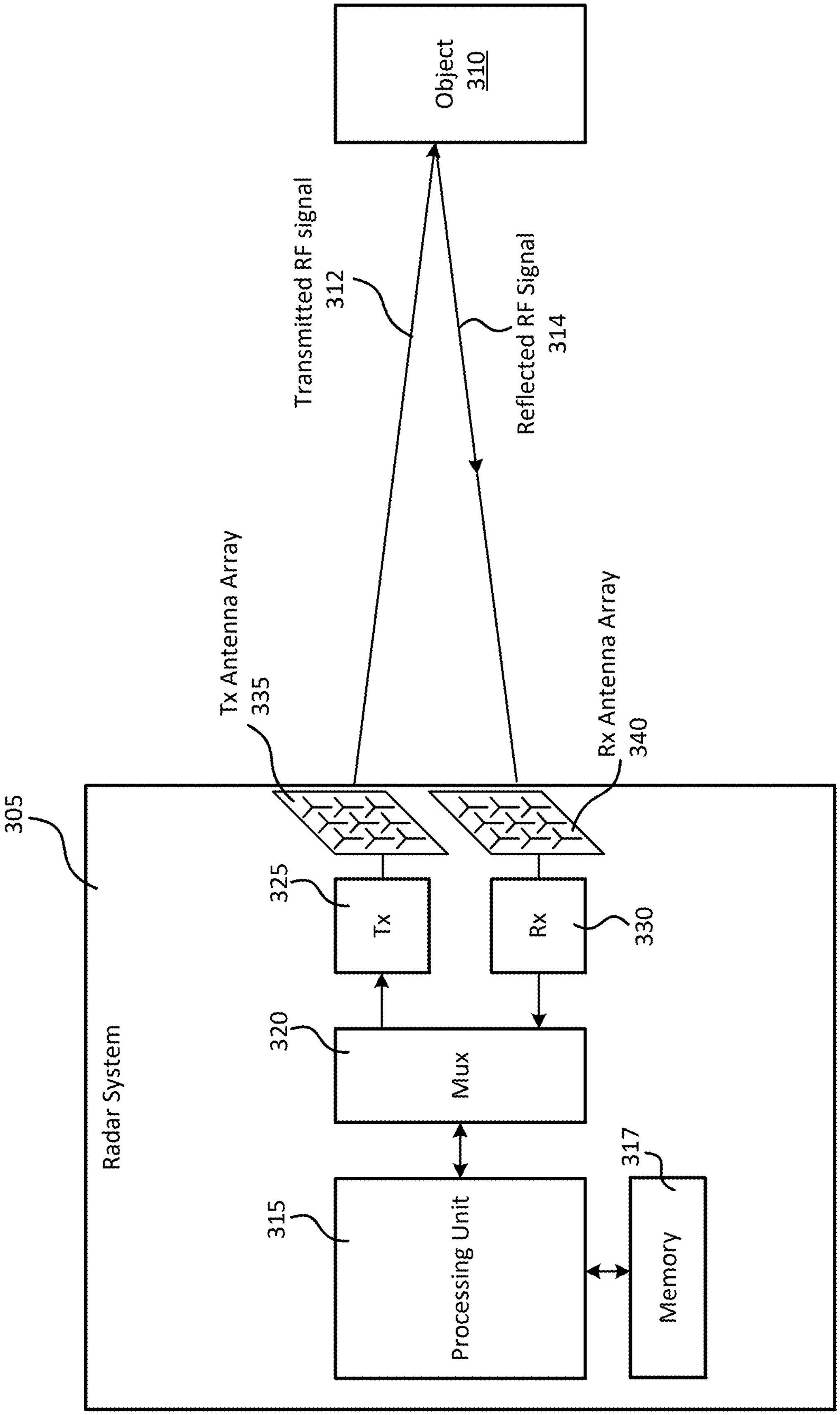
FIG. 3 is a block diagram of a radar system for presence detection, according to an embodiment.

FIG. 3 is a block diagram of a radar system 305 for presence detection, according to an embodiment. As used herein, the terms "waveform" and "sequence" and derivatives thereof are used interchangeably to refer to RF signals generated by a transmitter of the radar system and received by a receiver of the radar system for object detection. A "pulse" and derivatives thereof are generally referred to herein as waveforms comprising a sequence or complementary pair of sequences transmitted and received to generate a CIR. The radar system 305 may comprise a standalone device or may be integrated into a larger electronic device, such as a mobile phone or other device.

With regard to the functionality of the radar system 305 in FIG. 3, the radar system 305 can detect the proximity of an object 310 by generating a series of transmitted RF signals 312 (comprising one or more pulses). Some of these transmitted RF signals 312 reflect off of the object 310, and these reflected RF signals 314 are then processed by the radar system 305 using BF and DSP techniques (including leakage cancellation) to determine the object's location (azimuth, elevation, velocity, and range) relative to the radar system 305. Because embodiments may implement a flexible FOV, the radar system 305 can detect an object 310 within a select volume of space. This volume of space can be defined by a range of azimuths, elevations, and distances from the radar system 305. (As described below, this volume of space may also be defined by an FOV (a range of azimuths and elevations) and a range of distances within the FOV or from an area of interest corresponding to the FOV.)

To enable radar proximity detecting radar system 305 includes a processing unit 315, memory 317, multiplexer (mux) 320, Tx processing circuitry 325, and Rx processing circuitry 330. The radar system 305 may include additional components not illustrated, such as a power source, user interface, or electronic interface. It can be noted, however, that these components of the radar system 305 may be rearranged or otherwise altered in alternative embodiments, depending on desired functionality. Moreover, as used herein, the terms "transmit circuitry" or "Tx circuitry" refer to any circuitry utilized to create and/or transmit the transmitted RF signal 312. Likewise, the terms "receive circuitry" or "Rx circuitry" refer to any circuitry utilized to detect and/or process the reflected RF signal 314. As such, "transmit circuitry" and "receive circuitry" may not only comprise the Tx processing circuitry 325 and Rx processing circuitry 330 respectively but may also comprise the mux 320 and processing unit 315. In some embodiments, the processing unit may compose at least part of a modem and/or wireless communications interface. In some embodiments, more than one processing unit may be used to perform the functions of the processing unit 315 described herein.

The Tx processing circuitry 325 and Rx circuitry 330 may comprise subcomponents for respectively generating and detecting RF signals. As a person of ordinary skill in the art will appreciate, the Tx processing circuitry 325 may therefore include a pulse generator, digital-to-analog converter (DAC), a mixer (for up-mixing the signal to the transmit frequency), one or more amplifiers (for powering the transmission via Tx antenna array 335), etc. The Rx processing circuitry 330 may have similar hardware for processing a detected RF signal. In particular, the Rx processing circuitry 330 may comprise an amplifier (for amplifying a signal received via Rx antenna 340), a mixer for down-converting the received signal from the transmit frequency, an analog-to-digital converter (ADC) for digitizing the received signal, and a pulse correlator providing a matched filter for the pulse generated by the Tx processing circuitry 325. The Rx processing circuitry 330 may therefore use the correlator output as the CIR, which can be processed by the processing unit 315 (or other circuitry) for leakage cancellation as described herein. Other processing of the CIR may also be performed, such as object detecting, range, speed, or direction of arrival (DoA) estimation.

BF is further enabled by a Tx antenna array 335 and Rx antenna array 340. Each antenna array 335, 340 comprises a plurality of antenna elements. It can be noted that, although the antenna arrays 335, 340 of FIG. 3 include two-dimensional arrays, embodiments are not so limited. Arrays may simply include a plurality of antenna elements along a single dimension that provides for spatial cancellation between the Tx and Rx sides of the radar system 305. As a person of ordinary skill in the art will appreciate, the relative location of the Tx and Rx sides, in addition to various environmental factors can impact how spatial cancellation may be performed.

It can be noted that the properties of the transmitted RF signal 312 may vary, depending on the technologies utilized. Techniques provided herein can apply generally to "mmWave" technologies, which typically operate at 57-71 GHz, but may include frequencies ranging from 30-300 GHz. This includes, for example, frequencies utilized by the 802.11ad Wi-Fi standard (operating at 60 GHz). That said, some embodiments may utilize radar with frequencies outside this range. For example, in some embodiments, 5G frequency bands (e.g., 28 GHz) may be used. Because radar may be performed in the same busy bands as communication, hardware may be utilized for both communication and radar sensing, as previously noted. For example, one or more of the components of the radar system 305 shown in FIG. 3 may be included in a wireless modem (e.g., Wi-Fi or 5G modem). Additionally, techniques may apply to RF signals comprising any of a variety of pulse types, including compressed pulses (e.g., comprising Chirp, Golay, Barker, or Ipatov sequences) may be utilized. That said, embodiments are not limited to such frequencies and/or pulse types. Additionally, because the radar system may be capable of sending RF signals for communication (e.g., using 802.11 communication technology), embodiments may leverage channel estimation used in communication for performing proximity detection as provided herein. Accordingly, the pulses may be the same as those used for channel estimation in communication.

As noted, the radar system 305 may be integrated into an electronic device in which proximity detecting is desired. For example, the radar system 305, which can perform radar-based proximity detecting, may be part of communication hardware found in modern mobile phones. Other devices, too, may utilize the techniques provided herein. These can include, for example, other mobile devices (e.g., tablets, portable media players, laptops, wearable devices, virtual reality (VR) devices, augmented reality (AR) devices), as well as other electronic devices (e.g., security devices, on-vehicle systems). That said, electronic devices into which a radar system 305 may be integrated are not limited to mobile devices. Furthermore, radar-based proximity sensing as described herein may be performed by a radar system 305 that may not be otherwise used in wireless communication.

Although capable of providing a high degree of accuracy, directional proximity sensing shown in FIG. 3, if performed frequently, can be problematic in certain applications. For example, to perform a scan for a nearby object 310 the radar system 305 may transmit a large number of transmitted RF signals 312 such that each antenna element in the Rx antenna array 340 receives a reflected RF signal 314 corresponding to a transmitted RF signal 312 transmitted from each antenna element in the Tx antenna array 335. Moreover, the radar system 305 may perform a scan very frequently (e.g., several times per second). And thus, the directional proximity sensing performed by the radar system 305 may consume a large amount of power. This may be problematic for low-power applications.

Additionally or alternatively, for performing the presence detection disclosed herein, the Tx processing circuitry 325 may comprise ultrasonic transmitters (e.g., speakers) and the Rx processing circuitry 330 may comprise ultrasonic receivers (e.g., microphones). According to some implementations, a control system (not shown) may control the array of ultrasonic transducer elements to perform presence detection via amplitude modulation of transmitted ultrasonic carrier waves. In some such implementations, the ultrasonic carrier wave may be in the range of 20 kHz to 600 kHz. In some implementations, the ultrasonic carrier wave may be an amplitude-modulated carrier wave. According to some such implementations, the frequency of amplitude modulation may be in a range of, for example, 20 kHz to 48 kHz, according to the capabilities of speakers and microphones on the sensing device and may be adjusted as necessary.

Sensor Fusion

As noted above, different ranging modalities such as time-of-flight sensors, Light Detection and Ranging (LIDAR), or Red-Green-Blue (RGB) cameras are commonly used to track motion. While effective, these technologies tend to consume high amounts of power and raise privacy concerns due to their intrusive nature.

Figure 4:
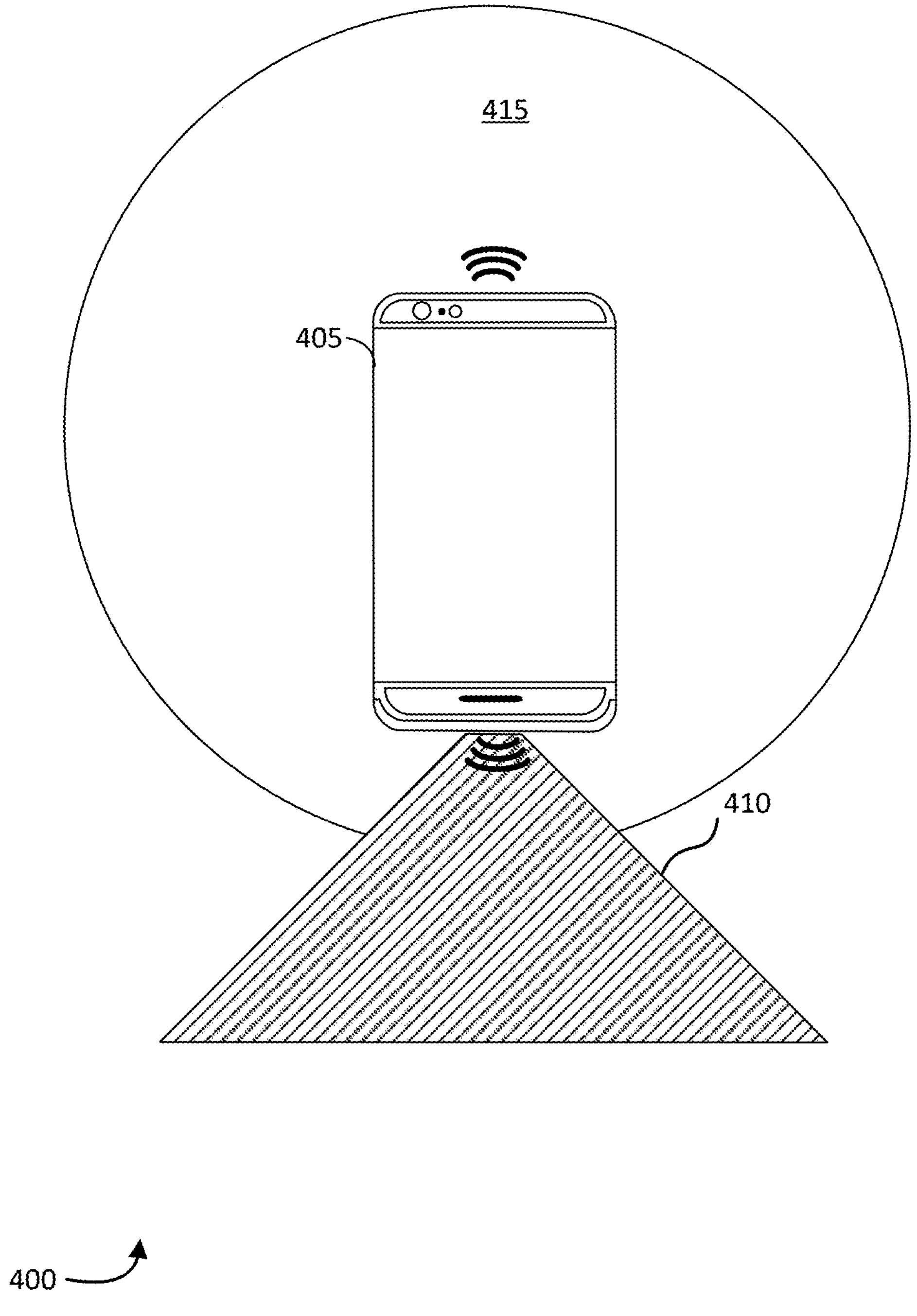
FIG. 4 illustrates an example environment around a sensing device with an ultrasound sensing configuration, according to an embodiment.

When performing presence detection using ultrasound sensors, the frequency band and the configuration of the ultrasound sensor (e.g., the microphones and speakers) significantly influence the directionality and power requirements for detection. For example, FIG. 4 illustrates an example environment 400 around a sensing device 405 with an ultrasound sensing configuration, according to an embodiment. The sensing device 405 may correspond to the mobile device 105 in FIG. 1 and/or the UE 205 in FIG. 2 and may include the radar system 305 in FIG. 3 for presence detection. As an example, the sensing device 405 may have a top speaker/microphone set (not shown) and a bottom speaker/microphone set with a Power-On-Reset (POR) configuration set at approximately 40% volume. This configuration results in the bottom microphone having a FOV 410 limited to around 100 degrees (e.g., about 100 degrees to 120 degrees). Beyond the FOV 410, the environment around the sensing device 405 may include a dead zone 415 where the bottom speakers/microphones set may not be able to detect targets. The FOV 410 can be further restricted if the speaker/microphone is obstructed by an object or covered with thick materials, posing a challenge as users can move in all directions.

Additionally, continuously monitoring the presence of a target using the ultrasound sensors (e.g., continuously operating the ultrasound system) is not desirable due to high power consumption. Also, it is preferable to avoid emitting tones that users may hear as the users approach the device, ensuring a more user-friendly and non-intrusive presence detection system. Therefore, a mechanism for optimizing power usage for presence detection is beneficial in this context.

According to the technical schemes disclosed herein, in some embodiments, a sensing device (e.g., a mobile device, a UE) capable of performing a sensor fusion may include different sets of sensors: low-power sensors (e.g., non-ultrasound sensors such as accelerometers, audio sensors, ambient light sensors, and/or other suitable passive sensors) and high-power sensors (e.g., ultrasound sensors including speakers and microphones and/or other suitable ultrasound sensors). The high-power sensors may consume more electrical power than the low-power sensors when performing a sensing function but may provide higher sensing accuracy.

When performing the presence detection, a non-ultrasound sensing function may first be performed using one or more low-power sensors of the sensing device to determine whether the target is within a first FOV of the ultrasound sensors (e.g., within about three feet of the sensing device). Responsive to the target being within the first FOV, ultrasound sensing may be performed using one or more ultrasound sensors of the sensing device. This approach reduces power consumption while maintaining detection accuracy.

Figure 5:
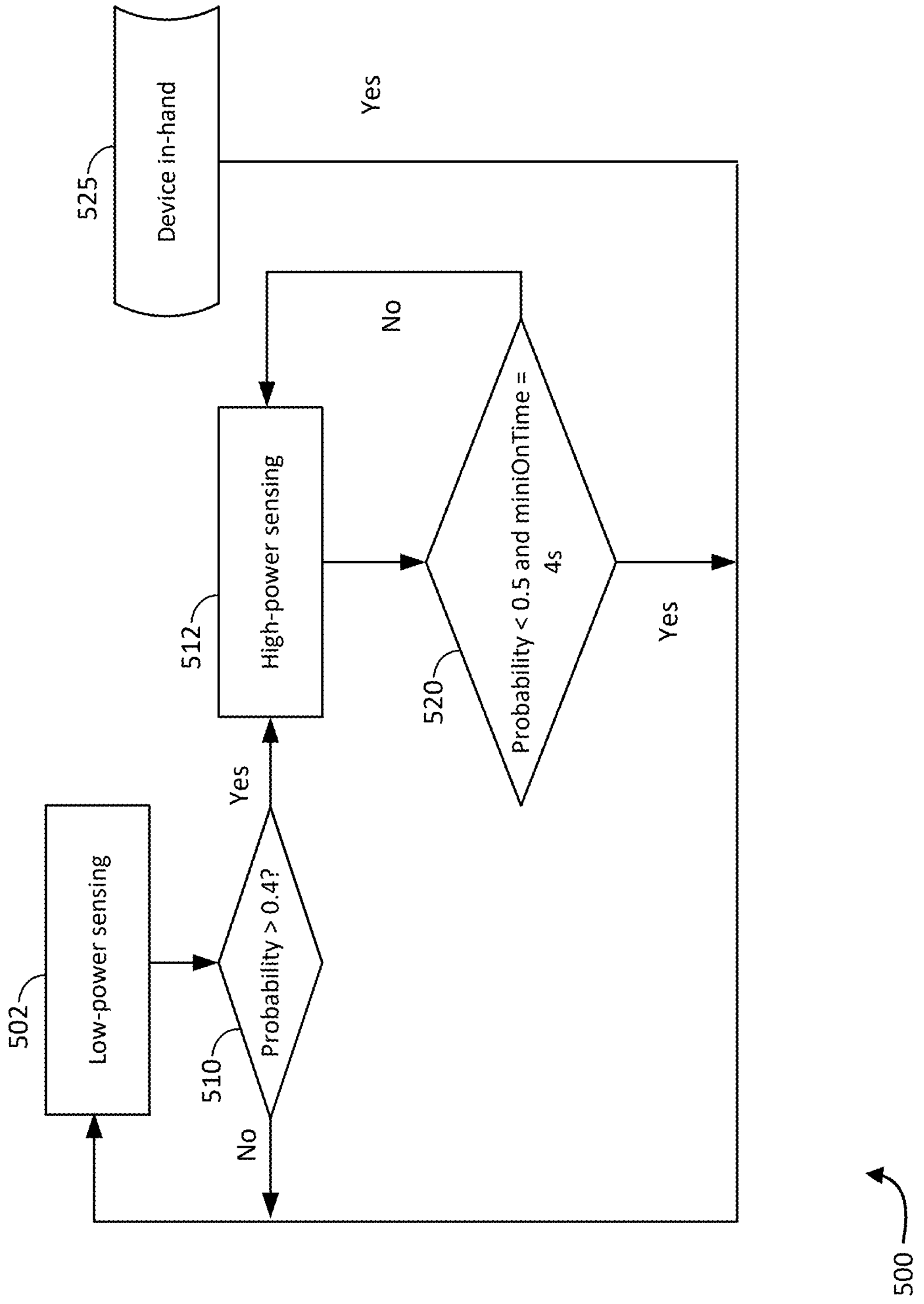
FIG. 5 illustrates a flow chart for a heuristic method for sensor fusion, according to an embodiment.

Specifically, when determining whether to switch from the low-power sensing (may also be referred as non-ultrasound sensing) to high-power sensing (may also be referred as ultrasound sensing), such as whether to active the ultrasound sensors, several techniques may be utilized. In some embodiments, a heuristic method may be implemented. For example, FIG. 5 illustrates a flow chart 500 for a heuristic method for sensor fusion, according to an embodiment.

Starting at block 502, the sensing device (e.g., the sensing device 405 in FIG. 4) may initiate the presence detection function using low-power sensing, with the high-power sensors (e.g., one or more ultrasound sensors) in a minimum functioning mode. This includes maintaining a minimum high-power sensing period to prevent turning off the high-power sensors too quickly, which could result in missed detections. Specifically, one or more low-power sensors (e.g., non-ultrasound sensors such as accelerometers, audio sensors, ambient light sensors, and/or other suitable passive sensors) of the sensing device may be configured to determine if a target is within a first FOV of the high-power sensors (e.g., approaching or leaving a FOV of about three feet from the sensing device).

In some embodiments, at block 510, a probability (e.g., a confidence level) of the target being within the first FOV may be determined based on the low-power sensing results. If the probability of the target being within the first FOV is higher than a first predetermined threshold (e.g., higher than 40%; "yes" at block 510 as shown in FIG. 5), the target may be determined to be within the first FOV. In response, at block 512, high-power sensing may be performed using one or more high-power sensors of the sensing device. For example, when the target is detected within the first FOV of the sensing device, the high-power sensors (e.g., one or more ultrasound sensors) will be activated from the minimum functioning mode to sense/track the target.

In some embodiments, when the high-power sensors are activated, at block 520, another probability (e.g., a confidence level) of the target being within the first FOV may be determined based on the high-power sensing results. If the probability of the target being within the first FOV is higher than a second predetermined threshold (e.g., higher than 50%; "No" at block 520 as shown in FIG. 5), the target may be determined to be within the first FOV, and the high-power sensors (e.g., one or more ultrasound sensors) may remain activated to continue tracking the target. Otherwise, if the probability is lower than the second predetermined threshold and the one or more high-power sensors have been staying in the minimum functioning mode for more than a predetermined duration (e.g., four seconds; "No" at block 520 as shown in FIG. 5), the high-power sensing may be deactivated. The sensing device falls back to block 502, where low-power sensing is performed with the high-power sensors returning to the minimum functioning mode.

In some embodiments, at block 525, if the sensing device is determined to be held by the user (e.g., the user is actively interacting with the sensing device), the sensing device can continue performing the functions in block 502 (e.g., performing low-power sensing with the high-power sensors in the minimum functioning mode) to reduce power consumption.

Additionally or alternatively, in some embodiments, when determining whether to transition from low-power sensing to high-power sensing (e.g., whether to activate the ultrasound sensors), a policy learning method may also be implemented. This method helps the sensing device optimize presence detection performance under various conditions.

For example, a policy learned and updated on the sensing device may be beneficial for presence detection, as it continuously adapts based on real-time data and past experiences. The policy learning method may integrate multiple parameters, including those that address outages in passive sensing modalities. For instance, in low lighting conditions where ambient light sensors (ALS) may be ineffective, or in environments with high background noise that can interfere with audio footstep detection, the system may adaptively adjust its sensing strategy.

In some embodiments, when optimizing the policy, the state of the sensing device may be defined by several factors, including the probability of approach, probability of leaving, probability of ultrasound detection, audio detect-to-background ratio, ultrasound blockage status, whether the device is in hand, etc. The control variable may be whether to activate ultrasound sensing. Costs associated with the policy may include assigning penalties for sensing results: assigning penalties for false determinations where the result of the passive sensing falsely indicates whether the target is within the first predetermined range of the sensing (e.g., device misses (false negatives) and/or false alarms (false positives)), latency for presence-to-absence and absence-to-presence transitions, general power consumption for active sensing, etc. Rewards may be assigned for correct detections, promoting accurate and efficient sensing.

For example, when the ground truth is presence-to-presence and the prediction is also presence, a positive reward may be assigned. Conversely, if the prediction is absence, a negative penalty (miss) may be assigned. These rewards and penalties may guide the policy to minimize false determinations and optimize the predetermined criteria for activating ultrasound sensors.

In some embodiments, to enhance the user experience, the policy may include user experience parameters, such as penalizing latency for transitions from absence to presence more heavily (e.g., assign higher penalties) than for transitions from presence to absence. Each episode between passive detection with high confidence for approaching and leaving can be used to refine the policy for ultrasound sensing.

Figure 6:
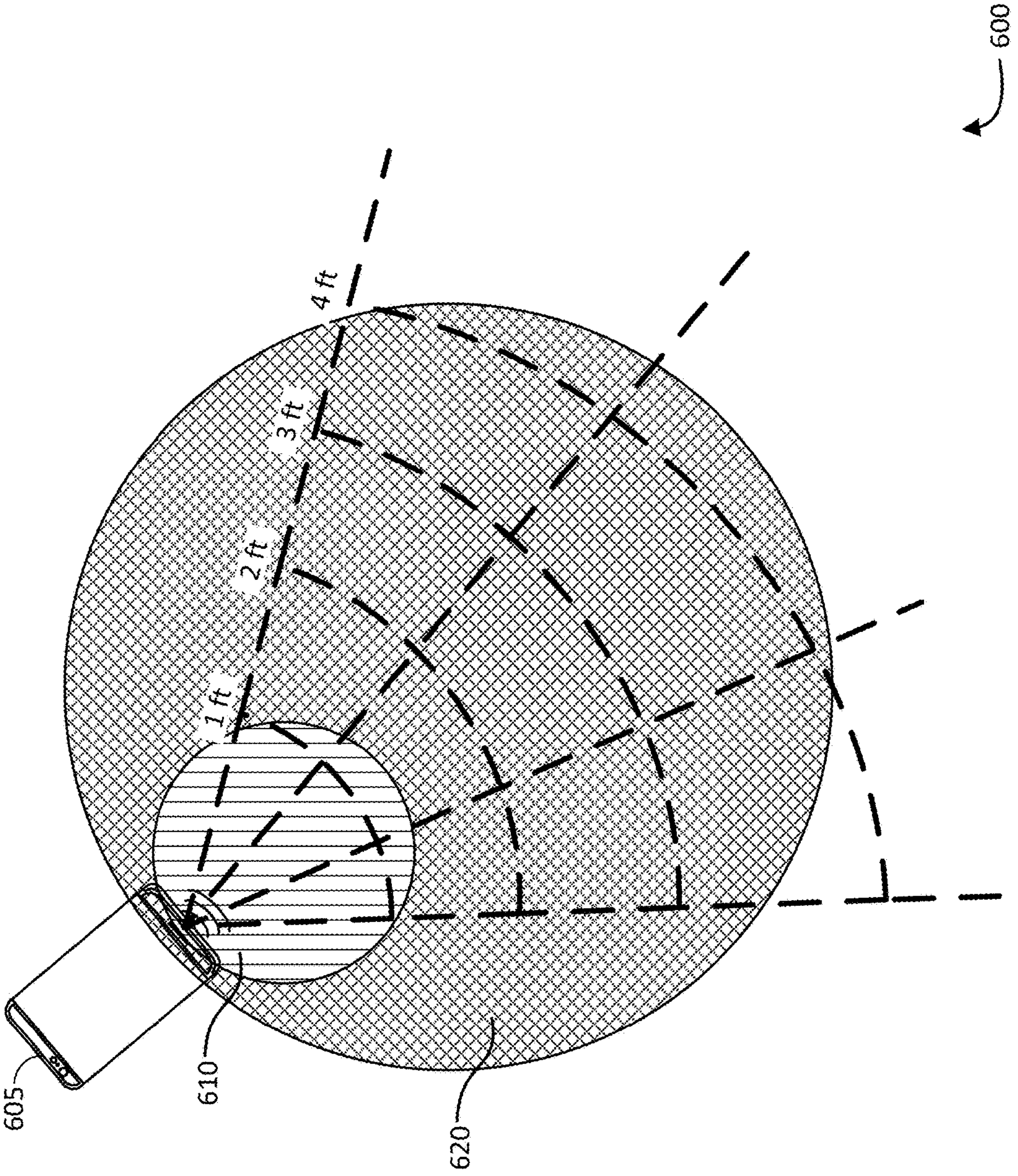
FIG. 6 illustrates an example environment of a sensing device when implementing a spatial-temporal ultrasound sensing, according to an embodiment.

To further enhance the performance, when performing high-power sensing (e.g., the ultrasound sensors are activated), sensing signals with different configurations (e.g., bandwidth, duration, power, etc.) may be used to further reduce power consumption while maintaining sensing accuracy. For example, FIG. 6 illustrates an example environment 600 of a sensing device 605 when implementing a spatial-temporal ultrasound sensing, according to an embodiment. The sensing device 605 may correspond to the mobile device 105 in FIG. 1, the UE 205 in FIG. 2, and/or the sensing device 405 in FIG. 4.

In some embodiments, a first high-power sensing configuration with a FOV 610 may be implemented when activating the high-power sensing. If the target is detected within the FOV 610, the first high-power sensing configuration may remain unchanged. On the other hand, if the target is not detected within the FOV 610, a second high-power sensing configuration using a second sensing signal with higher bandwidth, a longer duration, and/or a higher power (e.g., resulting in a larger FOV 620) than the first sensing signal may be implemented. In some embodiments, after the target is detected within the FOV 620 using the second high-power sensing configuration for a predetermined period of time (e.g., a few seconds) and/or if the target is detected approaching the sensing device 605, a third high-power sensing configuration using a third sensing signal with lower bandwidth, a shorter duration, and/or a lower power (e.g., resulting in a smaller FOV) than the second sensing signal may be implemented. That said, depending on the relative location of the target with respect to the sensing device 605, the high-power sensing configuration may be adaptively adjusted. This may further reduce power consumption for presence detection while maintaining accuracy.

As stated above, the sensing device 605 may comprise top speakers/microphones set, and bottom speakers/microphones set as shown in FIG. 4. Additionally or alternatively, in some embodiments, when the high-power sensors are activated, (e.g., the target is detected within the first FOV of the sensing device 605), both the top speakers/microphones set, and bottom speakers/microphones set may be activated to maximize detection accuracy. Subsequently, whether one of the top and/or bottom speakers/microphones set has a detection FOV larger than (e.g., covering) a predetermined detection FOV may be determined. If one of the top and/or bottom speakers/microphones set has a detection FOV covers the predetermined detection FOV, the other speakers/microphones may not need to remain activated and/or may be deactivated. This adaptive approach allows the system to optimize power consumption by utilizing a single speakers/microphones set when sufficient detection coverage is achieved, while maintaining accurate presence detection by activating both speakers/microphones sets as needed. It can be noted that the sensing device 605 of FIG. 6 is shown as a non-limiting example, and alternative embodiments may include devices with speakers/microphones (e.g., at other locations of the device) in addition, or as an alternative to, the top and/or bottom speakers/microphones shown in FIG. 6.

For ultrasound sensing, identifying background static reflections to cancel noise and/or other perturbations of the signal (e.g., differentiating moving targets, such as humans, in the background) may also be needed. The background can change dynamically as the sensing device moves, necessitating continuous calibration. To address this, both factory and user-guided calibrations may be implemented to identify the background and ensure optimal sensing performance.

For example, the factory calibration may involve identifying the noise distribution level when no object is present, which defines the minimum signal level for tracking reflected signals (e.g., determining a predetermined sensing calibration). It may also include identifying the signal strength for large objects at different points within the FOV without other multi-path static objects. This setup helps determine the optimal power and frequency range for the ultrasound sensing, considering different bandwidths and sample rates.

In some embodiments, to further enhance the sensing performance, user calibration accounts for variations introduced by user actions, such as placing a case on the sensing device, which may cover some speakers or microphones, may also be implemented (e.g., dynamically adjusting the predetermined sensing calibration based on the environment of the sensing device). This calibration helps identify if a particular speaker or microphone setup is unusable due to obstruction. Combining the factory and user calibrations helps define the noise (and/or other signal perturbation) levels and cancel the noise (and/or other signal perturbations), thus, optimizes the speaker and microphone setup for the sensing device's FOV. This dynamic adjustment of the predetermined sensing calibration based on the sensing device's environment ensures accurate presence detection while minimizing power consumption.

Collaborative Ultrasound Sensing

Ultrasound processing can utilize either multi-band or single frequency signals. When a new device enters the range of an existing device, the receiver on the new device can detect the transmission frequency of the existing device and adapt its own transmission accordingly. To reduce interference, each device may use a standard orthogonal sequence for frequency hopping. If the new device detects a specific periodicity in the existing device's transmission, the new device can identify and utilize an empty timeslot to ensure time-multiplexing, thereby avoiding overlap and reducing interference. Additionally, each device can share the sequence or band used for transmission on a common band at a certain low periodicity, allowing new devices to know the frequencies currently in use.

Figure 7:
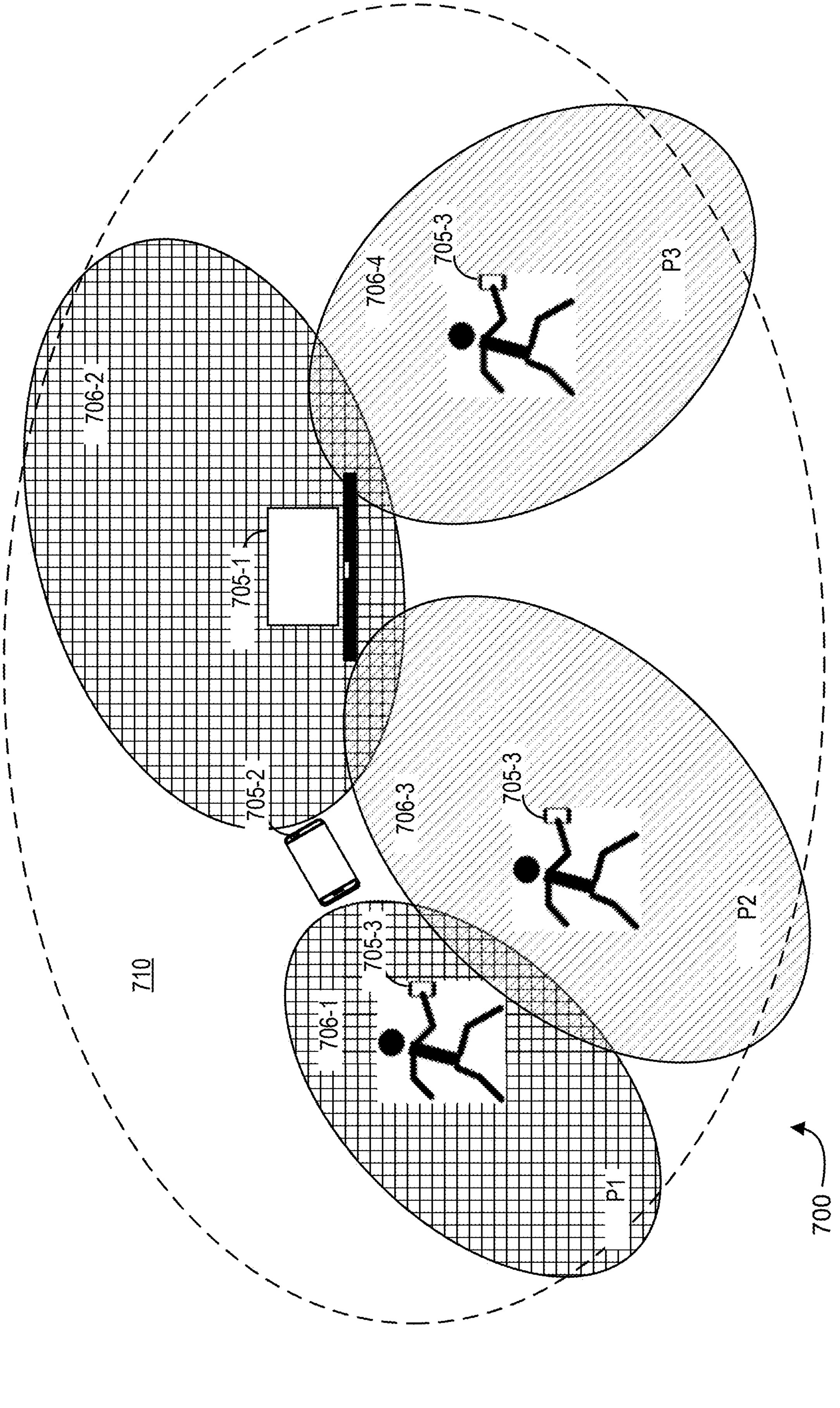
FIG. 7 shows an example environment where collaborate sensing is implemented, according to an embodiment.

In some embodiments, to further improve sensing performance, multiple nearby sensing devices can collaborate or be coordinated to increase a collective FOV formed by the individual FOVs of the multiple nearby sensing devices. For example, FIG. 7 shows an example environment 700 where collaborate sensing is implemented, according to an embodiment. The sensing devices 705-1 and 705-2 may correspond to the mobile device 105 in FIG. 1, the UE 205 in FIG. 2, the sensing device 405 in FIG. 4, and/or the sensing device 605 in FIG. 6. As shown in FIG. 7, The sensing device 705-1 may have FOVs 706-1 and 706-2 and the sensing device 705-2 may have FOVs 706-3 and 706-4. According to the collaborate sensing, FOVs 706-1, 706-2, 706-3, and 706-4 may be combined to form a collective FOV 710 shared among the sensing devices 705-1 and 705-2 to enhance each sensing device's sensing performance. For example, the sensing devices 705-1 and 705-2 may transmit capability reports to a coordinating device (e.g., one of the multiple sensing devices assigned with the coordinating role or a separate server), indicating one or more device resources (e.g., processing availability, computing power, electrical power, etc.) of the corresponding sensing device 705, to determine a collaborative ultrasound sensing configuration. The collaborative ultrasound sensing configuration may include parameters such as sensing signal pattern, transmission power, frequency bandwidth allocation, or any combination thereof, to optimize (e.g., increase and/or maximize) the collective FOV 710 under the constraints of the device resources of each of the sensing devices 705. An application involving a sensing device 705-3 associated with the target will be discussed in detail in the application examples below.

Figure 8:
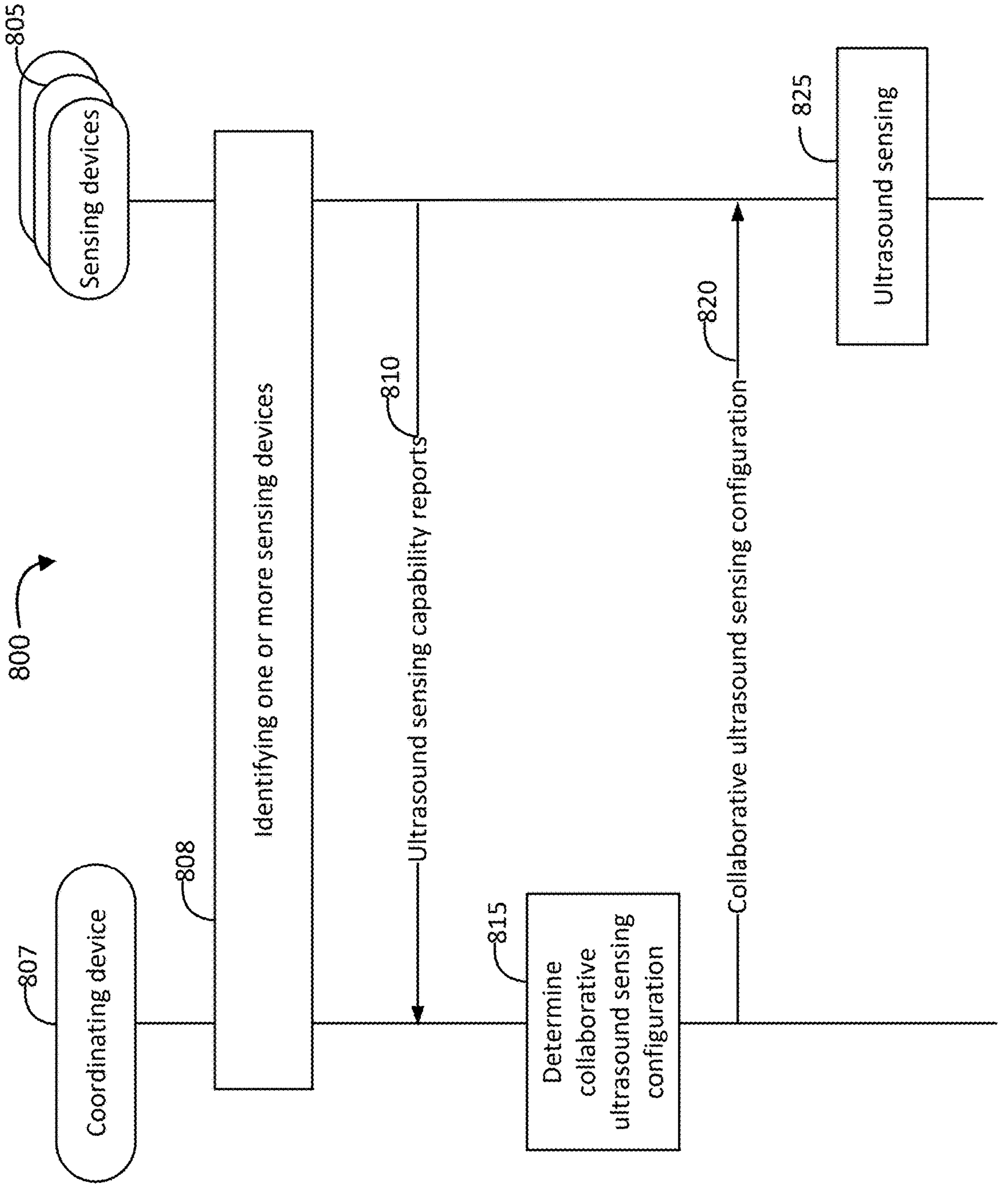
FIG. 8 shows a flow chart illustrating a collaborate sensing process, according to an embodiment.

For example, FIG. 8 shows a flow chart illustrating a collaborate sensing process 800, according to an embodiment. The collaborate sensing process 800 may be performed between multiple sensing devices 805 and a coordinating device 807. Multiple sensing devices 805 may correspond to the mobile device 105 in FIG. 1, the UE 205 in FIG. 2, the sensing device 405 in FIG. 4, the sensing device 605 in FIG. 6, and/or the sensing devices 705 in FIG. 7. The coordinating device 807 may correspond to one of the sensing devices 705 (e.g., a sensing device 805 assigned with a coordinating role) or a separate server (e.g., a location server 160 in FIG. 1, a LMF 220 in FIG. 2, a sensing server (SMF), or any suitable proprietary server).

Starting at block 808, the sensing devices 805 may be identified. For example, encrypted signals (e.g., including an encrypted authentication key or an encrypted sequence) may be share (e.g., using ultrasound signaling at a low rate, such as once per second) for authentication. The responding sensing device 805 may decrypt the signal and share encrypted acknowledgement to establish communication links. In some embodiments, the authentication may also be performed using the Radio Access Technologies other than ultrasound, such as Wi-Fi, Bluetooth, Ultra-Wideband, millimeter wave, etc.

At arrow 810, the sensing devices 805 may transmit capability reports to the coordinating device 807, indicating device parameters of the corresponding sensing device 805. In some embodiments, the capability reports may include parameters regarding location, orientation, battery capability, FOV, presence detection range, sensing signal pattern, device identity, transmission power, available frequency bandwidth, or any combination thereof, of the corresponding sensing device 805.

At block 815, the coordinating device 807 may determine a collaborative ultrasound sensing configuration based on the capability reports. In some embodiments, the coordinating device 807 may include an information aggregation engine and a FOV solver for aggregating the capability reports and determining the collaborative ultrasound sensing configuration. For example, the FOV solver may determine the collaborative ultrasound sensing configuration to iteratively and periodically optimize (e.g., increase and/or maximize) a collective sensing FOV (e.g., FOV 710 in FIG. 7) formed by individual FOVs (e.g., FOVs 706 in FIG. 7) of the sensing devices 805, under constraints of device resources for the sensing devices 805 and for limiting signal interference. In some embodiments, the collaborative ultrasound sensing configuration may include parameters such as sensing signal pattern, transmission power, frequency bandwidth allocation, or any combination thereof.

At arrow 820, the collaborative ultrasound sensing configuration may be transmitted to the sensing devices 805. In some embodiments, the coordinating device 807 may transmit the collaborative ultrasound sensing configuration to each of the sensing devices 805 through a direct communication link. Additionally or alternatively, the collaborative ultrasound sensing configuration may be transmitted to one or more sensing devices 805 with a direct communication link to the coordinating device 807 and then relayed to other sensing devices 805 through sidelink.

At block 825, the sensing devices 805 may perform the ultrasound sensing in accordance with the collaborative ultrasound sensing configuration. In some embodiments, during the sensing, the collective sensing FOV may be shared among the sensing devices 805 the sensing devices 805 to enhance each device's sensing performance.

In some embodiments, when performing ultrasound sensing in accordance with the collaborative ultrasound sensing configuration, one or more sensing devices 805 may obtain the collective FOV from the coordinating device 807. The collective FOV may be transmitted through a direct communication link with the coordinating device 807, or indirectly, through another sensing device 805 that has a direct communication link with the coordinating device 807 via sidelink.

In some embodiments, during the collaborative sensing process 800, the coordinating role (e.g., the sensing device acting as the coordinating device 807) may be dynamically adjusted among the sensing devices 805 and/or between the sensing devices 805 and the server. For example, if the coordinating device 807 is running low on power, or if a change in relative position makes another sensing device 805 more suitable for performing the coordinating role, the coordinating role may be adjusted accordingly.

Figure 9:
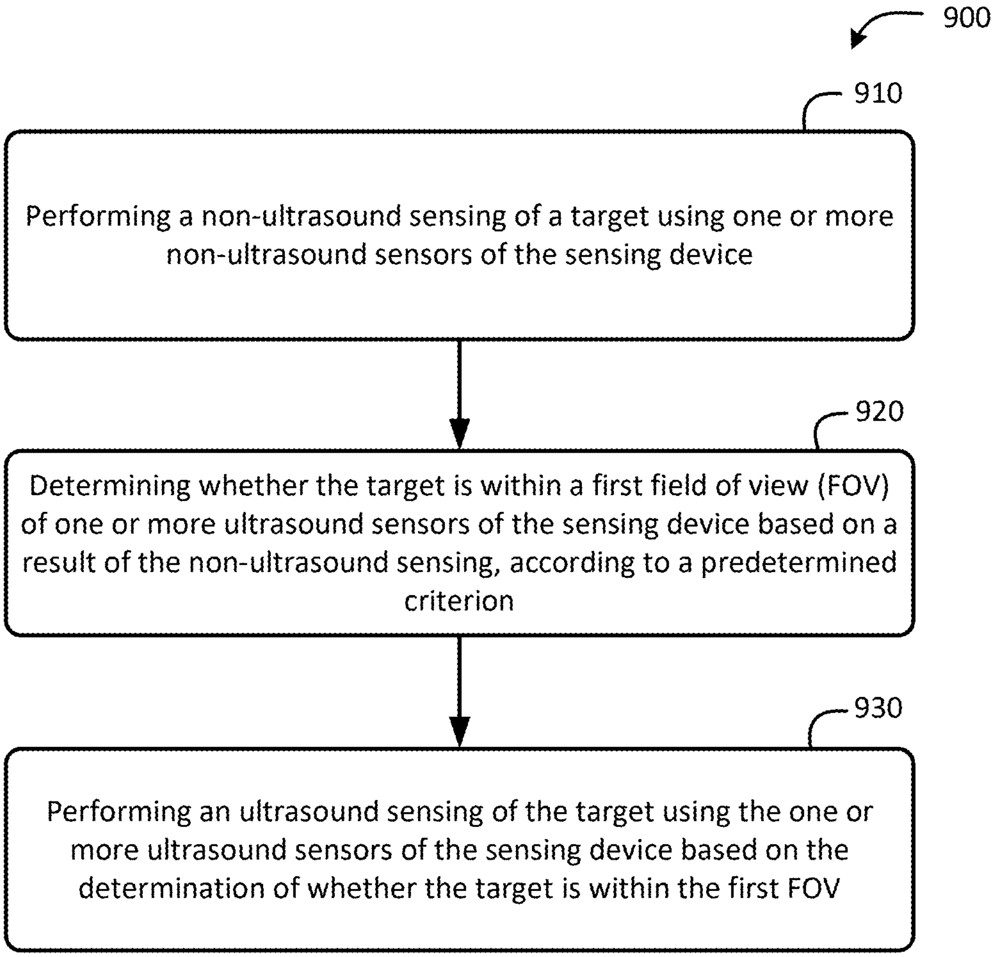
FIG. 9 is a flow diagram of a presence detection method, performed by a sensing device, according to some embodiments.

FIG. 9 is a flow diagram of a presence detection 900, performed by a sensing device, according to some embodiments. According to aspects of the disclosure, means for performing the functionality illustrated in one or more of the blocks shown in FIG. 9 may be performed by hardware and/or software components of a sensing device (which may comprise a mobile device (e.g., mobile device 105 of FIG. 1), UE (e.g., UE 205 of FIG. 2), sensing device (e.g., sensing device of FIGS. 4, 6, 7, and 8), or the like). Example components of a sensing device are illustrated in FIG. 12, which is described in more detail below.

At block 910, the functionality comprises performing a non-ultrasound sensing of a target using one or more non-ultrasound sensors of the sensing device.

Figure 12:
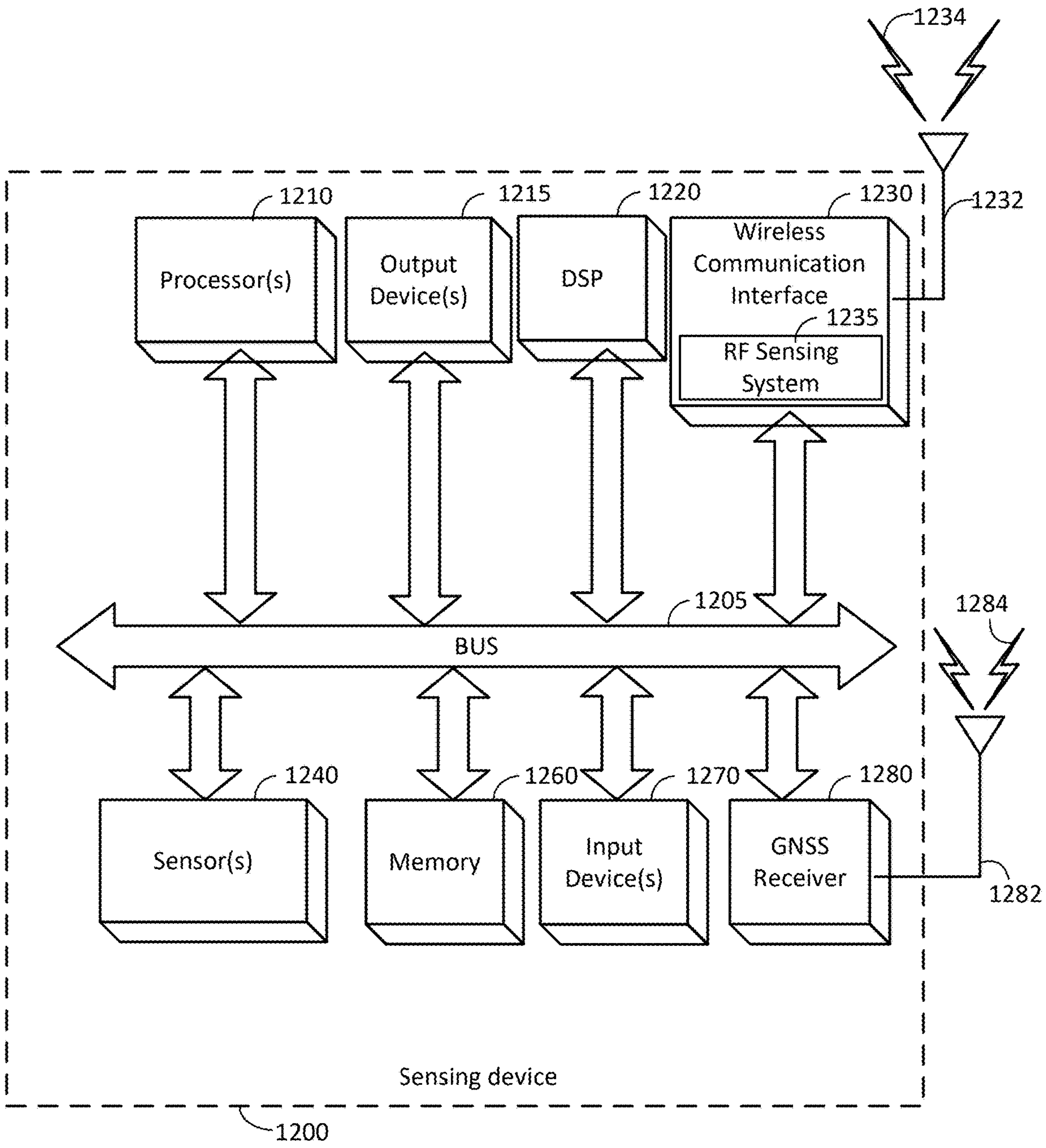
FIG. 12 is a block diagram of an embodiment of a sensing device, which can be utilized as described herein.

Means for performing functionality at block 910 may comprise a bus 1205, processor(s) 1210, digital signal processor (DSP) 1220, sensors 1240, memory/memories 1260, and/or other components of a sensing device 1200, as illustrated in FIG. 12, for example.

At block 920, the functionality comprises determining whether the target is within a FOV of one or more ultrasound sensors of the sensing device based on a result of the non-ultrasound sensing, according to a predetermined criterion.

Means for performing functionality at block 920 may comprise a bus 1205, processor(s) 1210, digital signal processor (DSP) 1220, sensors 1240, memory/memories 1260, and/or other components of a sensing device 1200, as illustrated in FIG. 12, for example.

At block 930, the functionality comprises performing an ultrasound sensing for the target using one or more ultrasound sensors of the sensing device based on the determination of whether the target is within the first FOV.

Means for performing functionality at block 930 may comprise a bus 1205, processor(s) 1210, digital signal processor (DSP) 1220, sensors 1240, memory/memories 1260, and/or other components of a sensing device 1200, as illustrated in FIG. 12, for example.

In some embodiments, performing the non-ultrasound sensing comprises performing a passive sensing of a target using the one or more passive sensors of the sensing device, wherein the one or more passive sensors perform the sensing function without emitting energy.

In some embodiments, the one or more passive sensors comprises a motion sensor, an audio sensor, an ambient light sensor, or any combination thereof, and wherein the ultrasound sensor comprises one or more speakers and one or more microphones.

In some embodiments, performing the ultrasound sensing comprises activating the ultrasound sensor responsive to the target being within the first FOV, and/or de-activating the ultrasound sensor responsive to the target being out of the first FOV of the sensing device.

In some embodiments, the one or more ultrasound sensors comprise a first speaker and a second speaker, and wherein performing the ultrasound sensing further comprises activating the first speaker and the second speaker responsive to the target being within the first FOV, determining if the first speaker has a detection FOV larger than a predetermined detection FOV, and responsive to the first speaker having the detection range larger than the predetermined detection FOV, de-activating the second speaker.

In some embodiments, performing the ultrasound sensing comprises determining if the target is within a second FOV of the one or more ultrasound sensors using a first sensing signal, and responsive to determining that the target is outside the second FOV, sensing the target using a second sensing signal.

In some embodiments, the second sensing signal has at least a higher bandwidth, a longer duration, or a higher power, than the first sensing signal.

In some embodiments, performing the ultrasound sensing further comprises filtering out perturbations from a sensing signal based on a predetermined sensing calibration.

In some embodiments, determining whether the target is within the first predetermined FOV comprises determining, based on the one or more passive sensors, that a confidence level of the target being within the first FOV is higher than a predetermined confidence level.

In some embodiments, determining whether the target is within the first predetermined FOV comprises updating the predetermined criterion based on assigning penalties to sensing results of the passive sensing.

In some embodiments, updating the predetermined criterion comprises assigning penalties for false determinations where the result of the non-ultrasound sensing falsely indicates whether the target is within the first FOV, and updating the predetermined criterion to minimize occurrence of the false determinations.

Figure 10:
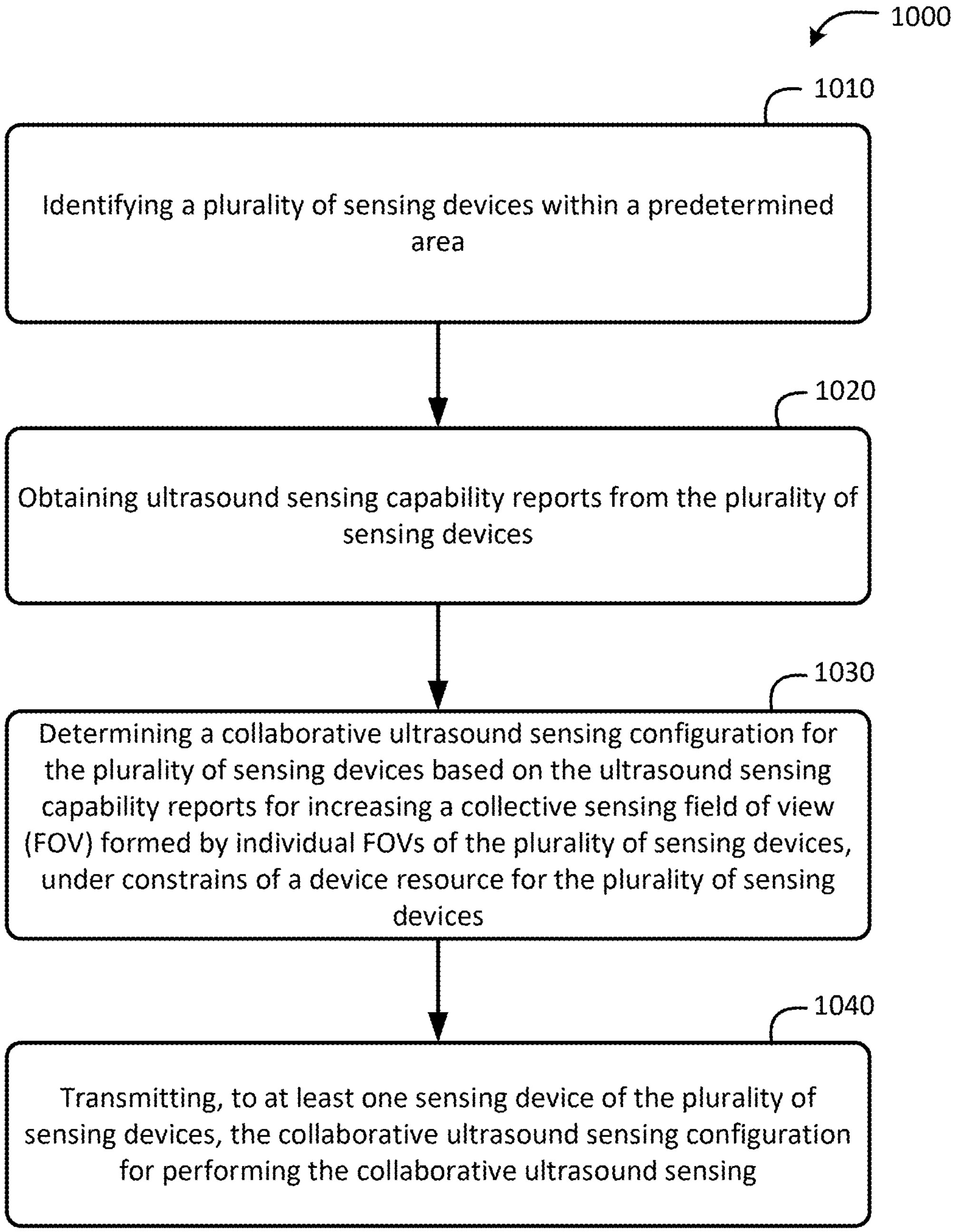
FIG. 10 is a flow diagram of a presence detection method, performed by a device assigned with a coordinating role (a coordinating device), according to some embodiments.
Figure 13:
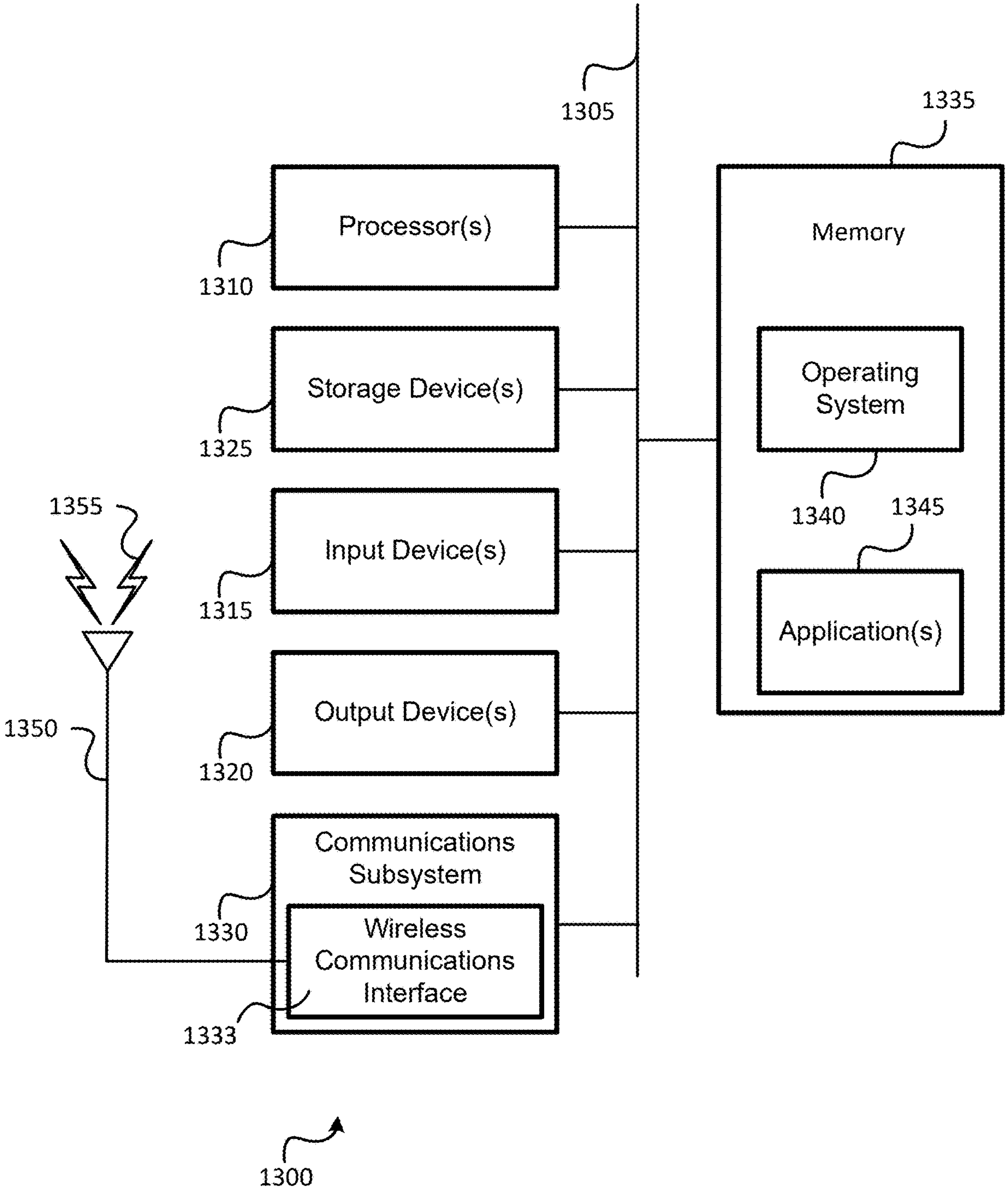
FIG. 13 is a block diagram of an embodiment of a computer system, which may be used, in whole or in part, to provide the functions of one or more components and/or devices as described in the embodiments herein.

FIG. 10 is a flow diagram of a presence detection method 1000, performed by a device assigned with a coordinating role (a coordinating device), according to some embodiments. According to aspects of the disclosure, means for performing the functionality illustrated in one or more of the blocks shown in FIG. 10 may be performed by hardware and/or software components of a sensing device (which may comprise a mobile device (e.g., mobile device 105 of FIG. 1), UE (e.g., UE 205 of FIG. 2), sensing device (e.g., sensing device of FIGS. 4, 6, 7, and 8), or the like) or a computing device (e.g., location server/LMF or sensing server/SMF) as noted above. Example components of a sensing device are illustrated in FIG. 12, which is described in more detail below. Example components of a computing device are illustrated in FIG. 13, which is described in more detail below.

At block 1010, the functionality comprises identifying a plurality of sensing devices within a predetermined area.

In cases where the coordinating device includes a sensing device, means for performing functionality at block 1010 may comprise a bus 1205, processor(s) 1210, digital signal processor (DSP) 1220, sensors 1240, memory/memories 1260, and/or other components of a sensing device 1200, as illustrated in FIG. 12, for example. In cases where the coordinating device includes a server, means for performing functionality at block 1010 may comprise a bus 1305, processor(s) 1310, storage device 1325, communication subsystem 1330, memory/memories 1335, and/or other components of a computer system 1300, as illustrated in FIG. 13, for example.

At block 1020, the functionality comprises obtaining ultrasound sensing capability reports from the plurality of sensing devices.

In cases where the coordinating device includes a sensing device, means for performing functionality at block 1010 may comprise a bus 1205, processor(s) 1210, digital signal processor (DSP) 1220, sensors 1240, memory/memories 1260, and/or other components of a sensing device 1200, as illustrated in FIG. 12, for example. In cases where the coordinating device includes a server, means for performing functionality at block 1010 may comprise a bus 1305, processor(s) 1310, storage device 1325, communication subsystem 1330, memory/memories 1335, and/or other components of a computer system 1300, as illustrated in FIG. 13, for example.

At block 1030, the functionality comprises determining a collaborative ultrasound sensing configuration for the plurality of sensing devices based on the ultrasound sensing capability reports for increasing a collective sensing FOV formed by individual FOVs of the plurality of sensing devices, under constrains of a device resource for the plurality of sensing devices.

In cases where the coordinating device includes a sensing device, means for performing functionality at block 1010 may comprise a bus 1205, processor(s) 1210, digital signal processor (DSP) 1220, sensors 1240, memory/memories 1260, and/or other components of a sensing device 1200, as illustrated in FIG. 12, for example. In cases where the coordinating device includes a server, means for performing functionality at block 1010 may comprise a bus 1305, processor(s) 1310, storage device 1325, communication subsystem 1330, memory/memories 1335, and/or other components of a computer system 1300, as illustrated in FIG. 13, for example.

At block 1040, the functionality comprises transmitting, to at least one sensing device of the plurality of sensing devices, the collaborative ultrasound sensing configuration for performing the collaborative ultrasound sensing.

In cases where the coordinating device includes a sensing device, means for performing functionality at block 1010 may comprise a bus 1205, processor(s) 1210, digital signal processor (DSP) 1220, sensors 1240, memory/memories 1260, and/or other components of a sensing device 1200, as illustrated in FIG. 12, for example. In cases where the coordinating device includes a server, means for performing functionality at block 1010 may comprise a bus 1305, processor(s) 1310, storage device 1325, communication subsystem 1330, memory/memories 1335, and/or other components of a computer system 1300, as illustrated in FIG. 13, for example.

In some embodiments, the device resource comprises processing availability, computing power, electrical power, or any combination thereof.

In some embodiments, the ultrasound sensing configuration comprises parameters regarding sensing signal pattern, transmission power, frequency bandwidth allocation, or any combination thereof.

In some embodiments, further comprising encrypting the parameters in the collaborative ultrasound sensing configuration.

In some embodiments, the presence detection method 1000 further comprises dynamically updating the collaborative ultrasound sensing configuration based on locations and orientations of the plurality of sensing devices and a target of the presence detection.

In some embodiments, the collaborative ultrasound sensing configuration comprises parameters regarding operation mode of the plurality of sensing devices.

In some embodiments, the ultrasound sensing capability reports comprise parameters regarding location, orientation; battery capability, FOV, presence detection range; sensing signal pattern, device identity, transmission power, available frequency bandwidth, or any combination thereof.

In some embodiments, the coordinating role is assigned to a sensing device of the plurality of sensing devices.

In some embodiments, the coordinating role is dynamically adjusted among the plurality of sensing devices.

In some embodiments, the presence detection method 1000 further comprises responsive to identifying the plurality of sensing devices, authenticating the plurality of sensing devices.

In some embodiments, ultrasound sensing capability reports are obtained from the plurality of sensing devices responsive to the authentication of the plurality of sensing devices.

In some embodiments, authenticating the plurality of sensing devices comprises authenticating the plurality of sensing devices using a Radio Access Technology.

In some embodiments, the Radio Access Technology comprises Wi-Fi, Bluetooth, Ultra-Wideband, millimeter wave, or any combination thereof.

Figure 11:
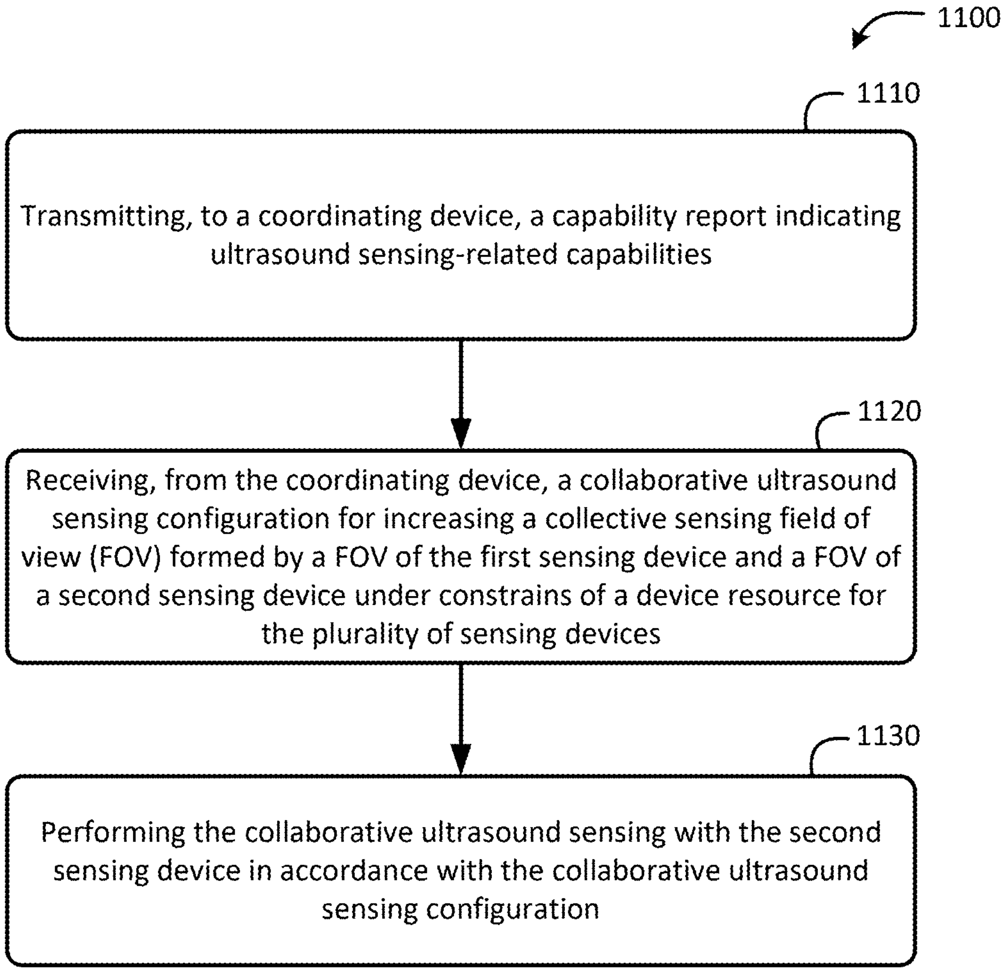
FIG. 11 is a flow diagram of a collaborative presence detection method, performed by a first sensing device, according to some embodiments.

FIG. 11 is a flow diagram of a collaborative presence detection method 1100, performed by a first sensing device, according to some embodiments. According to aspects of the disclosure, means for performing the functionality illustrated in one or more of the blocks shown in FIG. 11 may be performed by hardware and/or software components of a sensing device (which may comprise a mobile device (e.g., mobile device 105 of FIG. 1), UE (e.g., UE 205 of FIG. 2), sensing device (e.g., sensing device of FIGS. 4, 6, 7, and 8), or the like). Example components of a sensing device are illustrated in FIG. 12, which is described in more detail below.

At block 1110, the functionality comprises transmitting, to a coordinating device, a capability report indicating ultrasound sensing-related capabilities.

Means for performing functionality at block 1110 may comprise a bus 1205, processor(s) 1210, digital signal processor (DSP) 1220, sensors 1240, memory/memories 1260, and/or other components of a sensing device 1200, as illustrated in FIG. 12, for example.

At block 1120, the functionality comprises receiving, from the coordinating device, a collaborative ultrasound sensing configuration for increasing a collective sensing FOV formed by a FOV of the first sensing device and a FOV of a second sensing device under constrains of a device resource for the plurality of sensing devices.

Means for performing functionality at block 1120 may comprise a bus 1205, processor(s) 1210, digital signal processor (DSP) 1220, sensors 1240, memory/memories 1260, and/or other components of a sensing device 1200, as illustrated in FIG. 12, for example.

At block 1130, the functionality comprises performing a low-power sensing of a target using one or more low-power sensors of the sensing device.

Means for performing functionality at block 1130 may comprise a bus 1205, processor(s) 1210, digital signal processor (DSP) 1220, sensors 1240, memory/memories 1260, and/or other components of a sensing device 1200, as illustrated in FIG. 12, for example.

In some embodiments, the device resource comprises processing availability, computing power, electrical power, or any combination thereof.

In some embodiments, the ultrasound sensing configuration comprises parameters regarding sensing signal pattern, transmission power, frequency bandwidth allocation, or any combination thereof.

In some embodiments, the presence detection method 1100 further comprises encrypting the parameters in the collaborative ultrasound sensing configuration.

In some embodiments, the presence detection method 1100 further comprises obtaining the collective FOV for performing the collaborative ultrasound sensing.

POSSIBLE APPLICATIONS

The technical solutions disclosed herein may be used in multiple different scenarios. For example, below are several applications where the technical solutions disclosed herein may be implemented.

Application 1: Human Presence Detection for Security

This application leverages ultrasound sensing to enhance security by tracking human presence. For example, referring back to FIG. 7, as a user moves from point P1 to P2 to P3, if sensing devices 705-1 and 705-2 are known neighbors, their effective FOVs may be increased, allowing better tracking of user motion across a larger field. This may provide more confidence in determining the user intent, such as unlocking the screen of sensing devices 705-2 when the user moves away from sensing devices 705-1. Additionally, if the user's sensing devices 705-3 was connected to sensing devices 705-1 or 705-2, pre-authentication could have been done. The system can also detect and warn sensing devices 705-1 of potential eavesdropping if another user approaches while the previous user is using sensing devices 705-2.

In some embodiments, additionally or alternatively, ultrasound tracking can also seamlessly transfer activities like video playback from sensing device 705-1 to sensing devices 705-2 as the user moves. Furthermore, if the user is communicating via earbuds and moves from sensing device 705-1 to sensing devices 705-2, the system can switch communication to Wi-Fi if the Bluetooth signal is weaker.

Application 2: Fire and Earthquake Rescue/Recovery

Fire Rescue: Firefighters can use ultrasound sensing to detect if a user is approaching them during a rescue operation. Unlike IR sensors, which can be hampered by smoke, ultrasound sensors remain effective.

Earthquake Rescue: Ultrasound sensing can detect the presence of individuals trapped under debris, even if they cannot operate a device. This information can be relayed via RF or group ultrasound techniques, helping rescue teams prioritize areas with detected human presence.

Application 3: Automotive-Identifying Number of Users and Tracking Motion for Pets and Babies User and Motion Detection: This application involves using ultrasound to detect the number of users and their locations in a vehicle for safety and infotainment purposes. It can differentiate user voices, identify if a pet or baby is moving in the car, and track the number of users. Single device ultrasound signaling placed at a car mount location can identify the driver, front seat, and back seat passengers based on user motion.

Positional-Voice UI: Ultrasound can enhance in-car UI by distinguishing between driver and passenger requests, optimizing driving assistance inputs and entertainment controls.

Proximity Detection: If multiple users have ultrasound-capable devices, they can share proximity information, helping track each device's position and cover the entire car's FOV. Features like adjusting audio and fan speed based on user position can be automatically managed.

Application 4: Calibration of Smartwatch

Wearable devices like smartwatches often lack mechanisms to distinguish between left- and right-hand usage automatically. Ultrasound sensing can help differentiate between various orientations and hand positions. For instance, different wrist positions (e.g., left wrist default, left wrist rotated) can be distinguished by ultrasound, enabling the device to adjust its UI and IMU driver settings accordingly. This calibration ensures accurate detection zones and reduces dead zones, enhancing user experience and device functionality.

Application 5: Calibration of Ultrasound Controllers

This application involves automatically sensing and determining the device location and orientation concerning the user's body using ultrasonic presence detection. Ultrasound waveforms can be actively transmitted and received to determine spatial positioning. In a single TX-RX setting (e.g., a smartwatch), the limited FOV can help distinguish the speaker's facing direction. In a multiple TX-RX setting (e.g., XR controllers), the spatial energy concentration of the ultrasound array provides information about the user's body location relative to the device. This calibration ensures accurate device orientation and enhances user interaction with the device.

FIG. 12 is a block diagram of an embodiment of a sensing device 1200, which can be utilized as described herein. For example, sensing device 1200 may correspond to a mobile device (e.g., mobile device 105 of FIG. 1), UE (e.g., UE 205 of FIG. 2), sensing device (e.g., sensing device of FIGS. 4, 6, 7, and 8), or the like, as described herein. Further, as described below, the sensing device 1200 may implement an RF sensing system 1235, which may correspond to the radar system 305 described above with respect to FIG. 3. Moreover, according to some embodiments, a sensing device 1200 may function as a coordinating device or sensing device, as described herein, in some scenarios. As such, the sensing device 1200 may be capable of performing some or all of the functionality described in the methods regarding sensing device and/or coordinating devices as described herein. It should be noted that FIG. 12 is meant only to provide a generalized illustration of various components, any or all of which may be utilized as appropriate.

The sensing device 1200 is shown comprising hardware elements that can be electrically coupled via a bus 1205 (or may otherwise be in communication, as appropriate). The hardware elements may include a processor(s) 1210 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1210 may comprise one or more processing units, which may be housed in a single integrated circuit (IC) or multiple ICs. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below). The sensing device 1200 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The sensing device 1200 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the sensing device 1200 to communicate and/or perform positioning with other devices as described in the embodiments above, with respect to WLAN and/or cellular technologies. The wireless communication interface 1230 may permit data and signaling to be communicated (e.g., transmitted and received) with NG-RAN nodes of a network, for example, via eNBs, gNBs, ng-eNBs, access points, NTN satellites, various base stations, TRPs, and/or other access node types, and/or other network components, computer systems, and/or any other electronic devices communicatively coupled with TRPs, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

As noted above, the sensing device 1200 may implement an RF sensing system 1235. The RF sensing system 1235 may comprise the hardware and/or software elements described above with respect to FIG. 3. As illustrated in FIG. 12 and noted above, some or all of the RF sensing system 1235 may be implemented within a wireless communication interface 1230, which may utilize certain components for both communication and RF sensing. That said, embodiments are not so limited. Alternative embodiments may implement some or all of the RF sensing system 1235 separate from the wireless communication interface 1230 (e.g., in cases where RF sensing may utilize different frequencies and/or different hardware/software components than the wireless communication interface 1230).

Depending on desired functionality, the wireless communication interface 1230 may comprise a separate receiver and transmitter, or any combination of transceivers, transmitters, and/or receivers to communicate with base stations (e.g., ng-eNBs and gNBs) and other terrestrial transceivers, such as wireless devices and access points, as well as NTN satellites. The sensing device 1200 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The sensing device 1200 can further include sensor(s) 1240. Sensor(s) 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information. As noted in the description above, sensors 1240 may be used, for example, to determine a velocity of the sensing device, which may be reported to a configuring device, according to some embodiments.

Embodiments of the sensing device 1200 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the sensing device 1200, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS), and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1210, DSP 1220, and/or a processor within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1210 or DSP 1220.

The sensing device 1200 may further include and/or be in communication with a memory 1260. The memory 1260 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the sensing device 1200 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the sensing device 1200 (and/or processor(s) 1210 or DSP 1220 within sensing device 1200). In some embodiments, then, such code and/or instructions can be used to configure and/or adapt a general-purpose computer (or other device) to perform one or more operations in accordance with the described methods.

FIG. 13 is a block diagram of an embodiment of a computer system 1300, which may be used, in whole or in part, to provide the functions of one or more components and/or devices as described in the embodiments herein. The computer system 1300, for example, may be utilized within and/or executed by a server (e.g., location server/LMF or sensing server/SMF) or base station (e.g., gNB), which may perform the functions of a coordinating device (e.g., coordinating device 807 of FIG. 8) as described herein. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner. In addition, it can be noted that components illustrated by FIG. 13 can be localized to a single device and/or distributed among various networked devices, which may be disposed at different geographical locations.

The computer system 1300 is shown comprising hardware elements that can be electrically coupled via a bus 1305 (or may otherwise be in communication, as appropriate). The hardware elements may include processor(s) 1310, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1300 also may comprise one or more input devices 1315, which may comprise without limitation a mouse, a keyboard, a camera, a microphone, and/or the like; and one or more output devices 1320, which may comprise without limitation a display device, a printer, and/or the like.

The computer system 1300 may further include (and/or be in communication with) one or more non-transitory storage devices 1325, which can comprise, without limitation, local and/or network accessible storage, and/or may comprise, without limitation, a disk drive, a drive array, an optical storage device, a solid-state storage device, such as a random-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1300 may also include a communications subsystem 1330, which may comprise wireless communication technologies managed and controlled by a wireless communication interface 1333, as well as wired technologies (such as Ethernet, coaxial communications, universal serial bus (USB), and the like). The wireless communication interface 1333 may comprise one or more wireless transceivers that may send and receive wireless signals 1355 (e.g., signals according to 5G NR or LTE) via wireless antenna(s) 1350. Thus the communications subsystem 1330 may comprise a modem, a network card (wireless or wired), an infrared communication device, a wireless communication device, and/or a chipset, and/or the like, which may enable the computer system 1300 to communicate on any or all of the communication networks described herein to any device on the respective network, including UE, base stations and/or other transmission reception points (TRPs), satellites, and/or any other electronic devices described herein. Hence, the communications subsystem 1330 may be used to receive and send data as described in the embodiments herein.

In many embodiments, the computer system 1300 will further comprise a working memory 1335, which may comprise a RAM or ROM device, as described above. Software elements, shown as being located within the working memory 1335, may comprise an operating system 1340, device drivers, executable libraries, and/or other code, such as one or more applications 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1325 described above. In some cases, the storage medium might be incorporated within a computer system, such as computer system 1300. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method for presence detection, performed by a sensing device, the method comprising: performing a non-ultrasound sensing of a target using one or more non-ultrasound sensors of the sensing device; determining whether the target is within a first field of view (FOV) of one or more ultrasound sensors of the sensing device based on a result of the non-ultrasound sensing, according to a predetermined criterion; and performing an ultrasound sensing for the target using the one or more ultrasound sensors based on the determination of whether the target is within the first FOV.

Clause 2: The method of clause 1, wherein performing the non-ultrasound sensing comprises performing a passive sensing of a target using one or more passive sensors of the sensing device, wherein the one or more passive sensors perform the passive sensing function without emitting energy.

Clause 3: The method of clause 2, wherein the one or more passive sensors comprise: a motion sensor, an audio sensor, an ambient light sensor, or any combination thereof; and wherein the one or more ultrasound sensors ultrasound sensor comprises one or more speakers and one or more microphones.

Clause 4: The method of any one of clauses 1-3, wherein performing the ultrasound sensing further comprises: filtering out perturbations from a sensing signal cancelling noise based on a predetermined sensing calibration.

Clause 5: The method of clause 4, wherein performing the ultrasound sensing further comprises: dynamically adjusting the predetermined sensing calibration based on an environment of the sensing device.

Clause 6: The method of any one of clauses 4-5, wherein determining whether the target is within the first FOV comprises: updating the predetermined criterion based on assigning penalties to sensing results of the passive sensing.

Clause 7: The method of clause 6, wherein updating the predetermined criterion comprises: assigning penalties for false determinations where the result of the non-ultrasound sensing falsely indicates whether the target is within the first FOV; and updating the predetermined criterion to minimize occurrence of the false determinations.

Clause 8: The method of any one of clauses 1-7, wherein performing the ultrasound sensing comprises: activating the one or more ultrasound sensors ultrasound sensor responsive to a determination that the target being is within the first FOV; or de-activating the one or more ultrasound sensors ultrasound sensor responsive to a determination that the target being is out of the first FOV.

Clause 9: The method of clause 8, wherein the one or more ultrasound sensors comprise a first speaker and a second speaker, and wherein performing the ultrasound sensing further comprises: activating the first speaker and the second speaker responsive to a determination that the target being is within the first FOV; determining if the first speaker has a detection FOV larger than a predetermined detection FOV; and responsive to a determination that the first speaker having has the detection FOV larger than the predetermined detection FOV, de-activating the second speaker.

Clause 10: The method of any one of clauses 1-9, wherein performing the ultrasound sensing comprises: determining if the target is within a second FOV of the of one or more ultrasound sensors using a first sensing signal; and responsive to a determination that the target is outside the second FOV, sensing the target using a second sensing signal.

Clause 11: The method of any one of clauses 2-10, wherein the second sensing signal has at least a higher bandwidth, a longer duration, or a higher power, than the first sensing signal.

Clause 12: The method of clause 11, wherein determining whether the target is within the first FOV comprises: determining, based on the one or more non-ultrasound sensors, that a confidence level of the target being within the first FOV is higher than a predetermined confidence level.

Clause 13: A sensing device comprising: one or more non-ultrasound sensors; one or more memories; and one or more processors communicatively coupled with the one or more non-ultrasound sensors and the one or more memories, the one or more processors configured to: perform a non-ultrasound sensing of a target using the one or more non-ultrasound sensors; determine whether the target is within a first field of view (FOV) of one or more ultrasound sensors of the sensing device based on a result of the non-ultrasound sensing, according to a predetermined criterion; and perform an ultrasound sensing for the target using the one or more ultrasound sensors based on the determination of whether the target is within the first FOV.

Clause 14: The sensing device of clause 13, wherein, to perform the non-ultrasound sensing, the one or more processors are configured to perform a passive sensing of a target using one or more passive sensors of the sensing device, and wherein the one or more passive sensors are configured to perform the passive sensing without emitting energy.

Clause 15: The sensing device of clause 14, wherein the one or more passive sensors comprise: a motion sensor, an audio sensor, an ambient light sensor, or any combination thereof; and wherein the one or more ultrasound sensors comprise one or more speakers and one or more microphones.

Clause 16: The sensing device of any one of clauses 13-15, wherein, to perform the ultrasound sensing, the one or more processors are configured to: filter out perturbations from a sensing signal based on a predetermined sensing calibration.

Clause 17: The sensing device of clause 16, wherein to perform the ultrasound sensing, the one or more processors are configured to: activate the one or more ultrasound sensors responsive to a determination that the target is within the first FOV; or de-activating the one or more ultrasound sensors responsive to a determination that the target is out of the first FOV.

Clause 18: The sensing device of any one of clauses 16-17, wherein the one or more ultrasound sensors comprise a first speaker and a second speaker, and wherein to perform the ultrasound sensing, the one or more processors are configured to: activate the first speaker and the second speaker responsive to the target being within the first FOV; determine if the first speaker has a detection FOV larger than a predetermined detection FOV; and responsive to the first speaker having the detection FOV larger than the predetermined detection FOV, de-activate the second speaker.

Clause 19: The sensing device of any one of clauses 13-18, wherein, to perform the ultrasound sensing, the one or more processors are configured to: determine if the target is within a second FOV of the of one or more ultrasound sensors using a first sensing signal; and responsive to a determination that the target is outside the second FOV, sensing the target using a second sensing signal.

Clause 20: A sensing device comprising: means for performing a non-ultrasound sensing of a target using one or more non-ultrasound sensors of the sensing device; means for determining whether the target is within a first field of view (FOV) of one or more ultrasound sensors of the sensing device based on a result of the non-ultrasound sensing, according to a predetermined criterion; and means for performing an ultrasound sensing for the target using the one or more ultrasound sensors based on the determination of whether the target is within the first FOV.

Clause 21: A method for presence detection based on collaborative ultrasound sensing, performed by a device assigned with a coordinating role, the method comprising: identifying a plurality of sensing devices within a predetermined area; obtaining ultrasound sensing capability reports from the plurality of sensing devices; determining a collaborative ultrasound sensing configuration for the plurality of sensing devices based on the ultrasound sensing capability reports for increasing a collective sensing field of view (FOV) formed by individual FOVs of the plurality of sensing devices, under constraints of a device resource for the plurality of sensing devices; and transmitting, to at least one sensing device of the plurality of sensing devices, the collaborative ultrasound sensing configuration for performing the collaborative ultrasound sensing.

Clause 22: The method of clause 21, wherein the device resource comprises: processing availability; computing power; electrical power; or any combination thereof.

Clause 23: The method of either of clauses 21 or 22, wherein the collaborative ultrasound sensing configuration comprises parameters regarding: sensing signal pattern; transmission power; frequency bandwidth allocation; or any combination thereof.

Clause 24: The method of clause 23, further comprising: encrypting the parameters in the collaborative ultrasound sensing configuration.

Clause 25: The method of any one of clauses 21-24, further comprising: dynamically updating the collaborative ultrasound sensing configuration based on locations and orientations of the plurality of sensing devices and a target of the presence detection.

Clause 26: The method of clause 25, wherein the collaborative ultrasound sensing configuration comprises parameters regarding operation mode of the plurality of sensing devices.

Clause 27: The method of any one of clauses 21-26, wherein the ultrasound sensing capability reports comprise parameters regarding: location; orientation; battery capability; FOV; presence detection range; sensing signal pattern; device identity; transmission power; available frequency bandwidth; or any combination thereof.

Clause 28: The method of any one of clauses 21-27, wherein the coordinating role is assigned to a sensing device of the plurality of sensing devices.

Clause 29: The method of clause 28, the coordinating role is dynamically adjusted among the plurality of sensing devices.

Clause 30: The method of any one of clauses 21-29, further comprising: responsive to identifying the plurality of sensing devices, authenticating the plurality of sensing devices.

Clause 31: The method of clause 30, wherein ultrasound sensing capability reports are obtained from the plurality of sensing devices responsive to the authentication of the plurality of sensing devices.

Clause 32: The method of any one of clauses 30-31, wherein authenticating the plurality of sensing devices comprises: authenticating the plurality of sensing devices using a Radio Access Technology, ultrasound, or both.

Clause 33: The method of any one of clauses 21-32, wherein the Radio Access Technology comprises: Wi-Fi, Bluetooth, Ultra-Wideband, millimeter wave, or any combination thereof.

Clause 34: A method for presence detection based on collaborative ultrasound sensing, performed by a first sensing device, the method comprising: transmitting, to a coordinating device, a capability report indicating ultrasound sensing-related capabilities; receiving, from the coordinating device, a collaborative ultrasound sensing configuration for increasing a collective sensing field of view (FOV) formed by a FOV of the first sensing device and a FOV of a second sensing device under constraints of a device resource for the plurality of sensing devices; and performing the collaborative ultrasound sensing with the second sensing device in accordance with the collaborative ultrasound sensing configuration.

Clause 35: The method of clause 34, wherein the device resource comprises: processing availability; computing power; electrical power; or any combination thereof.

Clause 36: The method of either of clauses 34 or 35, wherein the collaborative ultrasound sensing configuration comprises parameters regarding: sensing signal pattern; transmission power; frequency bandwidth allocation; or any combination thereof.

Clause 37: The method of clause 36, further comprising: encrypting the parameters in the collaborative ultrasound sensing configuration.

Clause 38: The method of any one of clauses 34-37, further comprising: obtaining the collective FOV for performing the collaborative ultrasound sensing.

Clause 39: A device comprising: one or more transceivers; one or more memories; and one or more processors communicatively coupled with the one or more transceivers and the one or more memories, the one or more processors configured to: identify a plurality of sensing devices within a predetermined area; obtain ultrasound sensing capability reports from the plurality of sensing devices; determine a collaborative ultrasound sensing configuration for the plurality of sensing devices based on the ultrasound sensing capability reports for increasing a collective sensing field of view (FOV) formed by individual FOVs of the plurality of sensing devices, under constraints of a device resource for the plurality of sensing devices; and transmit, via the one or more transceivers to at least one sensing device of the plurality of sensing devices, the collaborative ultrasound sensing configuration for performing the collaborative ultrasound sensing.

Clause 40: The device of clause 39, wherein the device resource comprises: processing availability; computing power; electrical power; or any combination thereof.

Clause 41: The device of either of clauses 39 or 40, wherein the one or more processors are configured to include, in the collaborative ultrasound sensing configuration, parameters regarding: sensing signal pattern; transmission power; frequency bandwidth allocation; or any combination thereof.

Clause 42: The device of clause 41, wherein the one or more processors are further configured to: encrypt the parameters in the collaborative ultrasound sensing configuration.

Clause 43: The device of any one of clauses 39-42, wherein the one or more processors are further configured to: dynamically update the collaborative ultrasound sensing configuration based on locations and orientations of the plurality of sensing devices and a target of presence detection.

Clause 44: The device of clause 43, wherein the one or more processors are configured to include, in the collaborative ultrasound sensing configuration, parameters regarding operation mode of the plurality of sensing devices.

Clause 45: The device of any one of clauses 39-44, wherein the ultrasound sensing capability reports comprise parameters regarding: location; orientation; battery capability; FOV; presence detection range; sensing signal pattern; device identity; transmission power; available frequency bandwidth; or any combination thereof.

Clause 46: The device of any one of clauses 39-45, wherein the one or more processors are further configured to: responsive to identifying the plurality of sensing devices, authenticate the plurality of sensing devices.

Clause 47: The device of clause 46, wherein the one or more processors are configured to obtain the ultrasound sensing capability reports from the plurality of sensing devices responsive to the authentication of the plurality of sensing devices.

Clause 48: The device of any one of clauses 46-47, wherein, to authenticate the plurality of sensing devices, the one or more processors are configured to: authenticate the plurality of sensing devices using a Radio Access Technology, ultrasound, or both.

Clause 49: A first sensing device comprising: one or more transceivers; one or more memories; and one or more processors communicatively coupled with the one or more transceivers and the one or more memories, the one or more processors configured to: transmit, via the one or more transceivers to a coordinating device, a capability report indicating ultrasound sensing-related capabilities; receive, via the one or more transceivers from the coordinating device, a collaborative ultrasound sensing configuration for increasing a collective sensing field of view (FOV) formed by a FOV of the first sensing device and a FOV of a second sensing device under constraints of a device resource for a plurality of sensing devices; and perform the collaborative ultrasound sensing with the second sensing device in accordance with the collaborative ultrasound sensing configuration.

Clause 50: The first sensing device of clause 49, wherein the device resource comprises: processing availability; computing power; electrical power; or any combination thereof.

Clause 51: The first sensing device of either of clauses 49 or 50, wherein the collaborative ultrasound sensing configuration comprises parameters regarding: sensing signal pattern; transmission power; frequency bandwidth allocation; or any combination thereof.

Clause 52: The first sensing device clause 51, wherein the one or more processors are further configured to: encrypt the parameters in the collaborative ultrasound sensing configuration.

Clause 53: The first sensing device of any one of clauses 49-52, wherein the one or more processors are further configured to: obtain the collective FOV for performing the collaborative ultrasound sensing.

Clause 54: An apparatus having means for performing the method of any one of clauses 1-12 or 21-38.

Clause 54: A non-transitory computer-readable medium storing instructions, the instructions comprising code for performing the method of any one of clauses 1-12 or 21-38.

What is claimed is:

1. A method for presence detection based on collaborative ultrasound sensing, performed by a device assigned with a coordinating role, the method comprising:

identifying a plurality of sensing devices within a predetermined area;

obtaining ultrasound sensing capability reports from the plurality of sensing devices;

determining a collaborative ultrasound sensing configuration for the plurality of sensing devices based on the ultrasound sensing capability reports for increasing a collective sensing field of view (FOV) formed by individual FOVs of the plurality of sensing devices, under constraints of a device resource for the plurality of sensing devices, wherein the collaborative ultrasound sensing configuration comprises parameters regarding:

sensing signal pattern;

transmission power;

frequency bandwidth allocation; or any combination thereof; and transmitting, to at least one sensing device of the plurality of sensing devices, the collaborative ultrasound sensing configuration for performing the collaborative ultrasound sensing.

2. The method of claim 1, wherein the device resource comprises:

processing availability;

computing power;

electrical power; or any combination thereof.

3. The method of claim 1, further comprising:

encrypting the parameters in the collaborative ultrasound sensing configuration.

4. The method of claim 1, further comprising:

dynamically updating the collaborative ultrasound sensing configuration based on locations and orientations of the plurality of sensing devices and a target of the presence detection.

5. The method of claim 4, wherein the collaborative ultrasound sensing configuration comprises parameters regarding operation mode of the plurality of sensing devices.

6. The method of claim 1, wherein the ultrasound sensing capability reports comprise parameters regarding:

location;

orientation;

battery capability;

FOV;

presence detection range;

sensing signal pattern;

device identity;

transmission power;

available frequency bandwidth; or any combination thereof.

7. The method of claim 1, wherein the coordinating role is assigned to a sensing device of the plurality of sensing devices.

8. The method of claim 7, the coordinating role is dynamically adjusted among the plurality of sensing devices.

9. The method of claim 1, further comprising:

responsive to identifying the plurality of sensing devices, authenticating the plurality of sensing devices.

10. The method of claim 9, wherein ultrasound sensing capability reports are obtained from the plurality of sensing devices responsive to the authentication of the plurality of sensing devices.

11. The method of claim 9, wherein authenticating the plurality of sensing devices comprises:

authenticating the plurality of sensing devices using a Radio Access Technology, ultrasound, or both.

12. The method of claim 11, wherein the Radio Access Technology comprises: WiFi, Bluetooth, Ultra-Wideband, millimeter wave, or any combination thereof.

13. A device comprising:

one or more transceivers;

one or more memories; and one or more processors communicatively coupled with the one or more transceivers and the one or more memories, the one or more processors configured to:

identify a plurality of sensing devices within a predetermined area;

obtain ultrasound sensing capability reports from the plurality of sensing devices;

determine a collaborative ultrasound sensing configuration for the plurality of sensing devices based on the ultrasound sensing capability reports for increasing a collective sensing field of view (FOV) formed by individual FOVs of the plurality of sensing devices, under constraints of a device resource for the plurality of sensing devices, wherein the collaborative ultrasound sensing configuration comprises parameters regarding:

sensing signal pattern;

transmission power;

frequency bandwidth allocation; or any combination thereof; and transmit, via the one or more transceivers to at least one sensing device of the plurality of sensing devices, the collaborative ultrasound sensing configuration for performing the collaborative ultrasound sensing.

14. The device of claim 13, wherein the device resource comprises:

processing availability;

computing power;

electrical power; or any combination thereof.

15. The device of claim 13, wherein the one or more processors are further configured to:

encrypt the parameters in the collaborative ultrasound sensing configuration.

16. The device of claim 13, wherein the one or more processors are further configured to:

dynamically update the collaborative ultrasound sensing configuration based on locations and orientations of the plurality of sensing devices and a target of presence detection.

17. The device of claim 16, wherein the one or more processors are configured to include, in the collaborative ultrasound sensing configuration, parameters regarding operation mode of the plurality of sensing devices.

18. A device comprising:

means for identifying a plurality of sensing devices within a predetermined area;

means for obtaining ultrasound sensing capability reports from the plurality of sensing devices;

means for determining a collaborative ultrasound sensing configuration for the plurality of sensing devices based on the ultrasound sensing capability reports for increasing a collective sensing field of view (FOV) formed by individual FOVs of the plurality of sensing devices, under constraints of a device resource for the plurality of sensing devices, wherein the collaborative ultrasound sensing configuration comprises parameters regarding:

sensing signal pattern;

transmission power;

frequency bandwidth allocation; or any combination thereof; and means for transmitting, to at least one sensing device of the plurality of sensing devices, the collaborative ultrasound sensing configuration for performing the collaborative ultrasound sensing.

* * * * *